US010828833B2

(12) United States Patent
Enslow et al.

(10) Patent No.: US 10,828,833 B2
(45) Date of Patent: Nov. 10, 2020

(54) THREE DIMENSIONAL PRINTING SYSTEM WITH IMPROVED SUPPORT FIXTURE

(71) Applicant: 3D Systems, Inc., Rock Hill, SC (US)

(72) Inventors: Andrew Enslow, Escondido, CA (US); Mengshen Wu, San Diego, CA (US)

(73) Assignee: 3D Systems, Inc., Rock Hill, SC (US)

( * ) Notice: Subject to any disclaimer, the term of this patent is extended or adjusted under 35 U.S.C. 154(b) by 332 days.

(21) Appl. No.: 15/926,208

(22) Filed: Mar. 20, 2018

(65) Prior Publication Data
US 2018/0345578 A1 Dec. 6, 2018

Related U.S. Application Data

(63) Continuation-in-part of application No. 15/612,239, filed on Jun. 2, 2017, now Pat. No. 10,589,462.

(51) Int. Cl.
*B29C 64/245* (2017.01)
*B33Y 30/00* (2015.01)
*B29C 64/124* (2017.01)
*B33Y 10/00* (2015.01)

(52) U.S. Cl.
CPC ......... *B29C 64/245* (2017.08); *B29C 64/124* (2017.08); *B33Y 30/00* (2014.12); *B33Y 10/00* (2014.12)

(58) Field of Classification Search
CPC .......................... B29C 64/124; B29C 64/245
See application file for complete search history.

(56) References Cited

U.S. PATENT DOCUMENTS

| 7,052,263 B2 | 5/2006 | John |
| 2002/0171178 A1 | 11/2002 | Dean et al. |
| 2008/0170112 A1* | 7/2008 | Hull ............... B29C 64/124 347/127 |

(Continued)

FOREIGN PATENT DOCUMENTS

EP 1250997 10/2002

OTHER PUBLICATIONS

3D Systems, Figure 4 technology by 3D Systems, Apr. 1, 2016, YouTube, https://www.youtube.com/watch?v=V3vvflk2dOA (Year: 2016).*

(Continued)

*Primary Examiner* — Timothy Kennedy

(57) ABSTRACT

A support fixture is provided for forming a three dimensional article of manufacture onto a lower build surface thereof. The formation of the three dimensional article occurs in a resin vessel containing photocurable resin. The resin vessel includes a transparent sheet that forms a lower bound for the resin. The support fixture includes an interface fixture and a replaceable support. The interface fixture includes an upper portion having alignment and gripping features, a lower portion surrounding a central opening and including a plurality of attachment features, and a side wall coupling the upper and lower portions. The replaceable support includes a planar portion having a lower surface (providing the lower build surface) for attachment of the three dimensional article of manufacture and a peripheral support portion including complementary attachment features engaging the attachment features when the peripheral support portion is mounted to the lower portion of the interface fixture.

13 Claims, 23 Drawing Sheets

(56) References Cited

U.S. PATENT DOCUMENTS

2015/0231831 A1* 8/2015 El-Siblani ............. B29C 64/241
　　　　　　　　　　　　　　　　　　　　　　　　264/401
2017/0113417 A1　4/2017 Deotte

OTHER PUBLICATIONS

PCT International Search Report the International Searching Authority for PCT/US2018/035292, dated Oct. 19, 2018 (6 pages).
PCT Written Opinion of the International Searching Authority for PCT/US2018/035292, dated Oct. 19, 2018 (9 pages).
"Satgod:" Muve 3D DLP printer update, Dec. 6, 2016 (Dec. 6, 2016), XP054978636, retrieved from the Internet: URL:https://www.youtube.com/watch?v=QvMOZ8Oozrk [retrieved on Aug. 27, 2018] 22 seconds—2 minutes 20 seconds (1 page).
Rapael Scherer: "Bauanleitung zum Bau de MUVe 1.5 DLP 3D Drucker", Oct. 6, 2015 (Oct. 6, 2015), pp. 1-75, XP055503515, retrieved from the Internet: URL:https://cadprint.ch/images/downloads/mUVe_1-5.pdf [retrieved on Aug. 30, 2018] p. 39 to p. 44.

* cited by examiner ously cured by a
light engine.
THREE DIMENSIONAL PRINTING SYSTEM WITH IMPROVED SUPPORT FIXTURE

CROSS REFERENCE TO RELATED APPLICATIONS

This patent application is a continuation-in-part of U.S. patent application Ser. No. 15/612,239, entitled "Three Dimensional Printing System with Improved Support Fixture" by Andrew Enslow, filed on Jun. 2, 2017, and incorporated herein by reference.

FIELD OF THE INVENTION

The present disclosure concerns an apparatus and method for fabrication of solid three dimensional (3D) articles of manufacture from radiation curable (photocurable) resins. More particularly, the present disclosure enables a printing system to increase operational speed and to optimize a support structure for the 3D articles.

BACKGROUND

Three dimensional (3D) printers are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support surface, and a controllable light engine. The stereolithography system forms a three dimensional (3D) article of manufacture by selectively curing layers of the photocurable resin onto a "support fixture". Each selectively cured layer is formed at a "build plane" within the resin.

One rate-limiting factor is the time required for motion of a lower portion of the build fixture through the resin. The fluid drag of the resin exerts forces upon the support fixture and the resin vessel. If the forces are too high damage to the resin vessel can occur. There is a need to improve minimize this fluidic drag. Other important factors are build surface materials optimization and time required to start a new build process.

SUMMARY

Figure 1A:
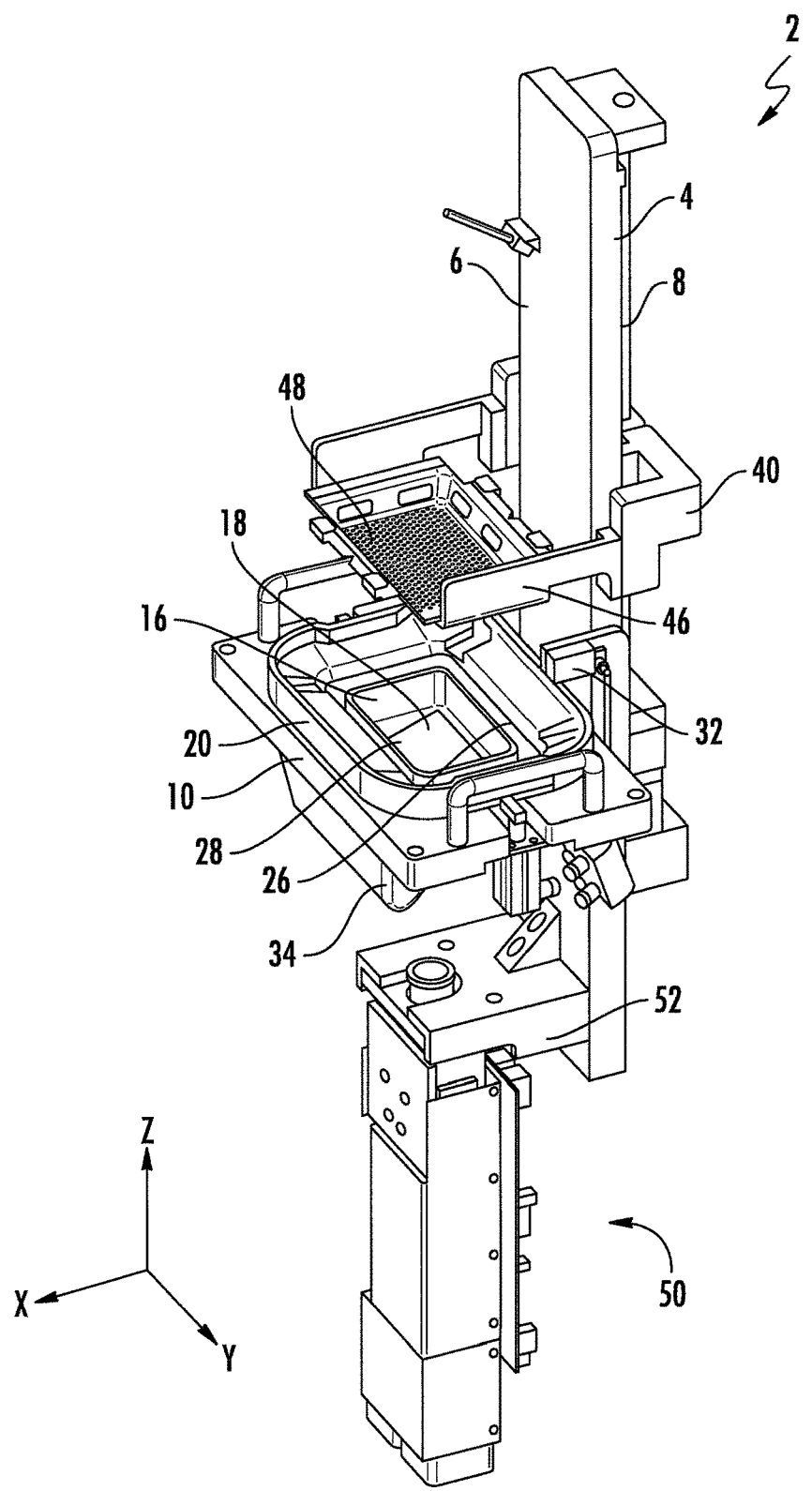
FIG. 1A is an isometric drawing depicting an exemplary three dimensional printing system.

In a first aspect of the disclosure, a support fixture is provided for forming a three dimensional article of manufacture onto a lower build surface thereof. The formation occurs in a resin vessel containing photocurable resin. The resin vessel includes a transparent sheet that forms a lower bound for the resin. The support fixture includes a lower planar portion, an upper portion, and a side wall coupling the lower planar portion to the upper portion. The lower planar portion defines a dense array of small openings that minimize a fluid drag of lateral resin motion when the lower build surface is moving vertically and is proximate to the transparent sheet. The upper portion is for providing a machine gripping within the three dimensional printing system. A plurality of large openings are formed in the support fixture along the side wall. The large openings individually have a cross sectional area that is equal to a combined cross sectional area of a plurality of the small openings.

In one implementation the dense array of small openings are a greater factor than the large openings in reducing fluid drag just before the fabrication of the three dimensional article of manufacture begins. The large openings are a greater factor than the dense array of small openings in reducing fluid drag when a sufficient portion of the three dimensional article of manufacture has been fabricated.

In a second aspect of the disclosure, a three dimensional printing system is provided for forming a three dimensional article of manufacture in a resin vessel containing resin and having a transparent sheet forming a lower bound for the resin. The three dimensional printing system includes a support fixture, a vertical support member, a carriage, and a pair of receiving arms. The support fixture includes a lower planar portion, an upper portion, and a side wall coupling the lower planar portion to the upper portion. The carriage is configured to translate vertically along the vertical support member. The pair of receiving arms extend from the carriage and are configured to engage the upper portion of the support fixture to secure the support fixture to the carriage when the lower planar portion of the support fixture is being raised and lowered in the resin.

In one implementation the upper portion or the entire support fixture is formed from a magnetic material. The receiving arms include magnets to magnetically secure the support fixture to the carriage when the lower planar portion of the support fixture is being lowered into the resin.

In a third aspect of the disclosure, a support fixture is provided for forming a three dimensional article of manufacture onto a lower build surface thereof. The formation of the three dimensional article occurs in a resin vessel containing photocurable resin. The resin vessel includes a transparent sheet that forms a lower bound for the resin. The support fixture includes an interface fixture and a replaceable support. The interface feature includes an upper portion having alignment and gripping features, a lower portion surrounding a central opening and including a plurality of attachment features, and a side wall coupling the upper and lower portions. The replaceable support includes a planar portion having a lower surface (providing the lower build surface) for attachment of the three dimensional article of manufacture and a peripheral support portion including complementary attachment features engaging the attachment features when the peripheral support portion is mounted to the lower portion of the interface fixture.

In one implementation the interface fixture is formed from a metallic material and the replaceable support is formed from a polymeric material. The metallic material can be magnetic.

In another implementation at least the upper portion of the interface fixture is formed form a magnetic material.

In yet another implementation the upper portion of the interface fixture extends laterally outwardly from the side wall. The side wall includes a portion defining an oblique angle with respect to a vertical axis and the lateral extension of the upper portion of the interface fixture.

In a further implementation the planar portion defines an array of small openings. The side wall defines a plurality of larger openings individually having a cross sectional area equal to a plurality of the small opening cross sectional areas. The array of small openings includes at least 100 small openings. The array of small openings defines an inflow distance of less than two millimeters.

In a yet further implementation the lower portion of the interface fixture includes a rim that extends inwardly to the edges of the central opening, the rim has a lower surface, the peripheral support portion of the replaceable support has an upper surface mounted to the lower surface of the rim. The attachment features include openings that pass vertically through the rim. The complementary attachment features extend upwardly from the upper surface of the peripheral support portion and through the openings.

In another implementation the attachment features in the rim include openings that pass through the rim. The complementary attachment features include pins that pass into the openings and secure the replaceable support to the interface fixture by one or more of an interference fit and an interlocking engagement.

In a fourth aspect of the invention, a replaceable support includes a planar portion and a peripheral support portion. The replaceable support can be used with a three dimensional printing system for forming a three dimensional article of manufacture in a resin vessel containing resin and having a transparent sheet forming a lower bound for the resin. The planar portion has a lower build surface defining a dense array of at least 100 small openings. Groups of the small openings define an inflow distance of less than three millimeters when the lower build surface is proximate to the transparent sheet. The peripheral support portion has an upper surface and a plurality of upstanding attachment features for coupling the replacement support to an interface feature through one or more of an interference fit and an interlocking engagement.

In one implementation the dense array of small openings define an inflow distance of less than two millimeters.

In another implementation the dense array of small openings includes at least 200 small openings.

In yet another implementation the upstanding attachment features are upstanding pins, at least one of the pins includes a laterally deformable end and a narrower portion between the upper surface and the laterally deformable end.

In a further implementation the replaceable support is integrally formed from a polymer.

DETAILED DESCRIPTION OF THE PREFERRED EMBODIMENTS

Figure 1B:
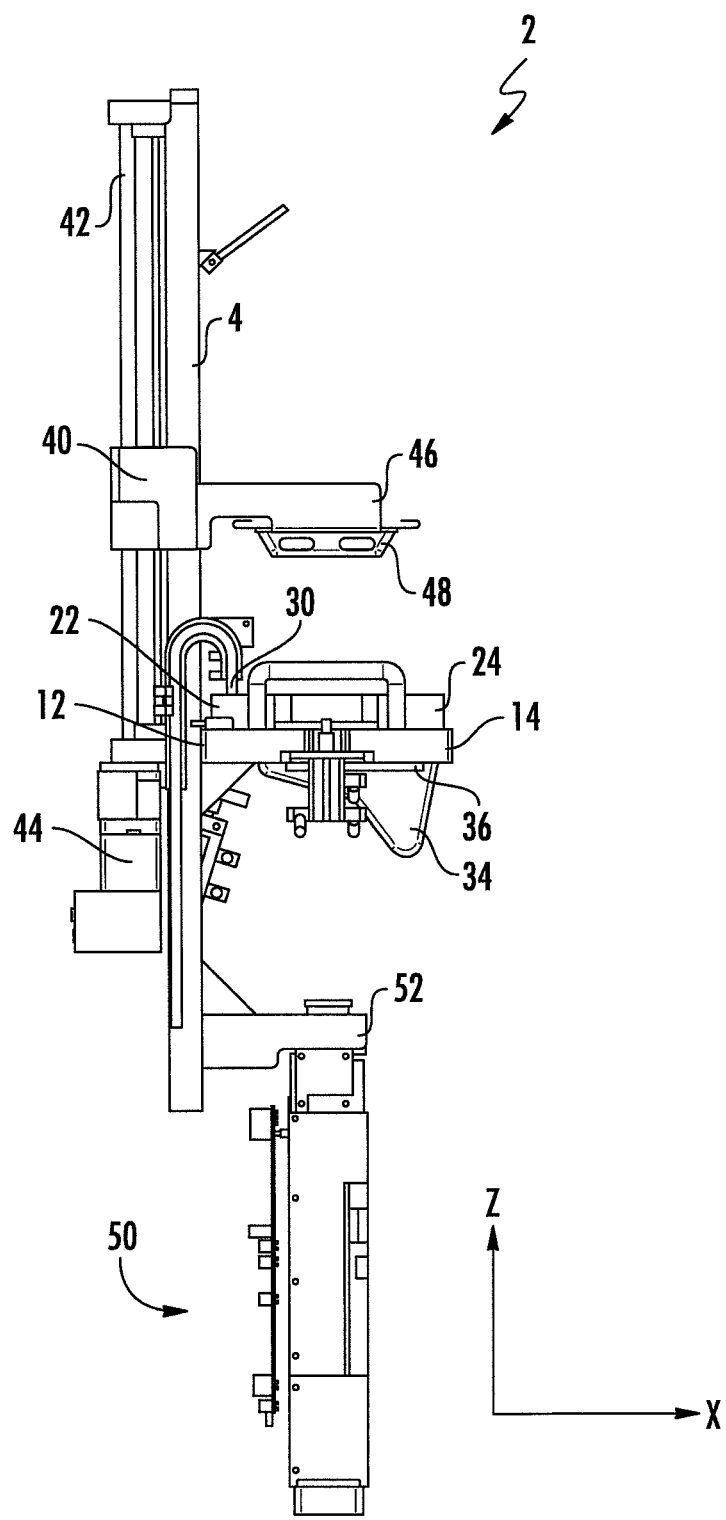
FIG. 1B is a side view of an exemplary three dimensional printing system.
Figure 1C:
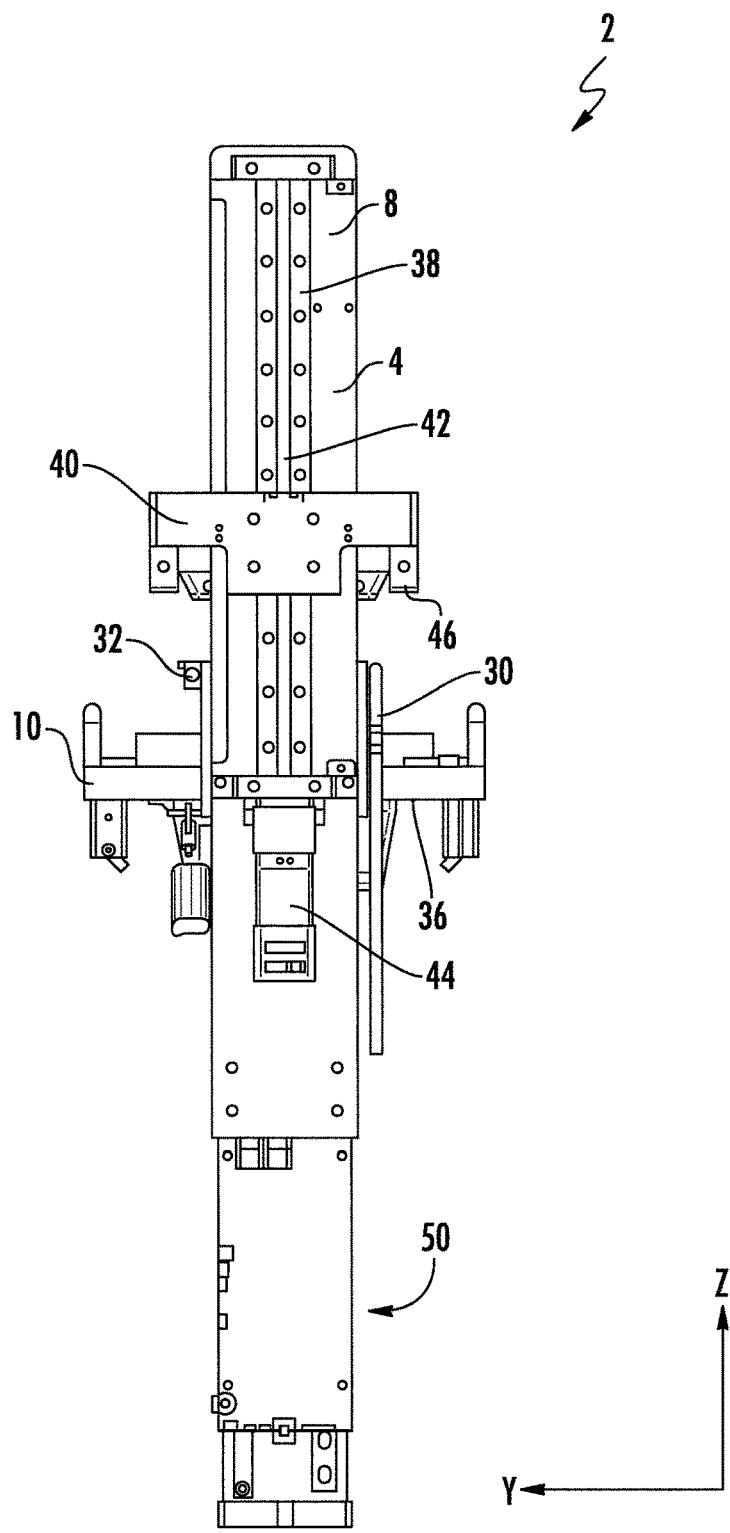
FIG. 1C is a rear view of an exemplary three dimensional printing system.

FIGS. 1A-C are views of an exemplary three dimensional (3D) printing system 2. FIG. 1A is an isometric view, FIG. 1B is a side view, and FIG. 1C is a rear view. In describing printing system 2 axes X, Y, and Z are used to illustrate positions, directions, and motions. Axes X, Y, and Z are mutually orthogonal. Axes X and Y are "lateral" or "horizontal" axes. Axis Z is a "vertical" axis. Axis Z is typically aligned or nearly aligned with a gravitational reference. In describing directions the following conventions will be used: +Y is to the "right" and −Y is to the "left." +Z is generally upward and −Z is generally downward.

Three dimensional printing system 2 includes a vertical support 4 having a front side 6 and a back side 8. Vertical support 4 generally provides a "vertical backbone" from which other components of three dimensional printing system 2 are mounted.

A support plate 10 is mounted to the vertical support 4. Support plate 10 has a proximal end 12 that is proximate to the front side 6 of vertical support 4. Support plate 10 extends from proximal end 12 to distal end 14 along the lateral axis X. Support plate 10 has an inner surface 16 facing inwardly and defining a central opening 18.

A resin vessel 20 is supported by the support plate 10. The resin vessel 20 has a rear portion 22 that is proximate to the proximal end 12 of the support plate 10. The resin vessel 20 has a front portion 24 that is proximate to the distal end 14 of the support plate 10. Resin vessel 20 has an inner edge 26 that surrounds a central opening 28. The central openings 18 and 28 are laterally aligned with respect to each other to enable an optical path for vertically projected pixelated light. Central opening 28 is laterally contained within central opening 18.

A resin fluid outlet 30 is positioned over the rear portion 22 of resin vessel 20. A fluid level sensor 32 is positioned over the rear portion 22 of the resin vessel 20. The resin fluid outlet 30 and fluid level sensor 32 are separated from each other along the lateral axis Y.

A fluid spill containment vessel 34 is releasably mounted to a lower side 36 of the support plate 10. Fluid spill containment vessel 34 is for capturing any resin spills resulting from damage to or overfilling of the resin vessel 20. The fluid spill containment vessel 34 includes a window (to be discussed below). The window is laterally aligned with the central openings 18 and 28 to enable the aforementioned optical path for vertically projected pixelated light.

Mounted to the rear side 8 of vertical support 4 is a vertical track 38. A carriage 40 is mounted in sliding engagement with the vertical track 38. A motorized lead screw 42 is configured to drive the carriage 40 along vertical axis Z. The lead screw 42 is coupled to motor system 44 which rotates the lead screw 42 to drive the carriage 40 vertically along the vertical track 38. A pair of fixture receiving arms 46 extend from the carriage 40 along the lateral axis X. Supported between the receiving arms 46 is a support fixture 48.

A light engine 50 is mounted to the vertical support 4 via a support bracket 52. Support bracket 52 extends away from the front side 6 of vertical support 4 along lateral axis X. Pixelated light from light engine 50 is projected vertically upwardly. The pixelated light passes through the fluid spill containment vessel 34, the support plate 10, and the vessel 20 to a build plane within the resin vessel 20.

Figure 2A:
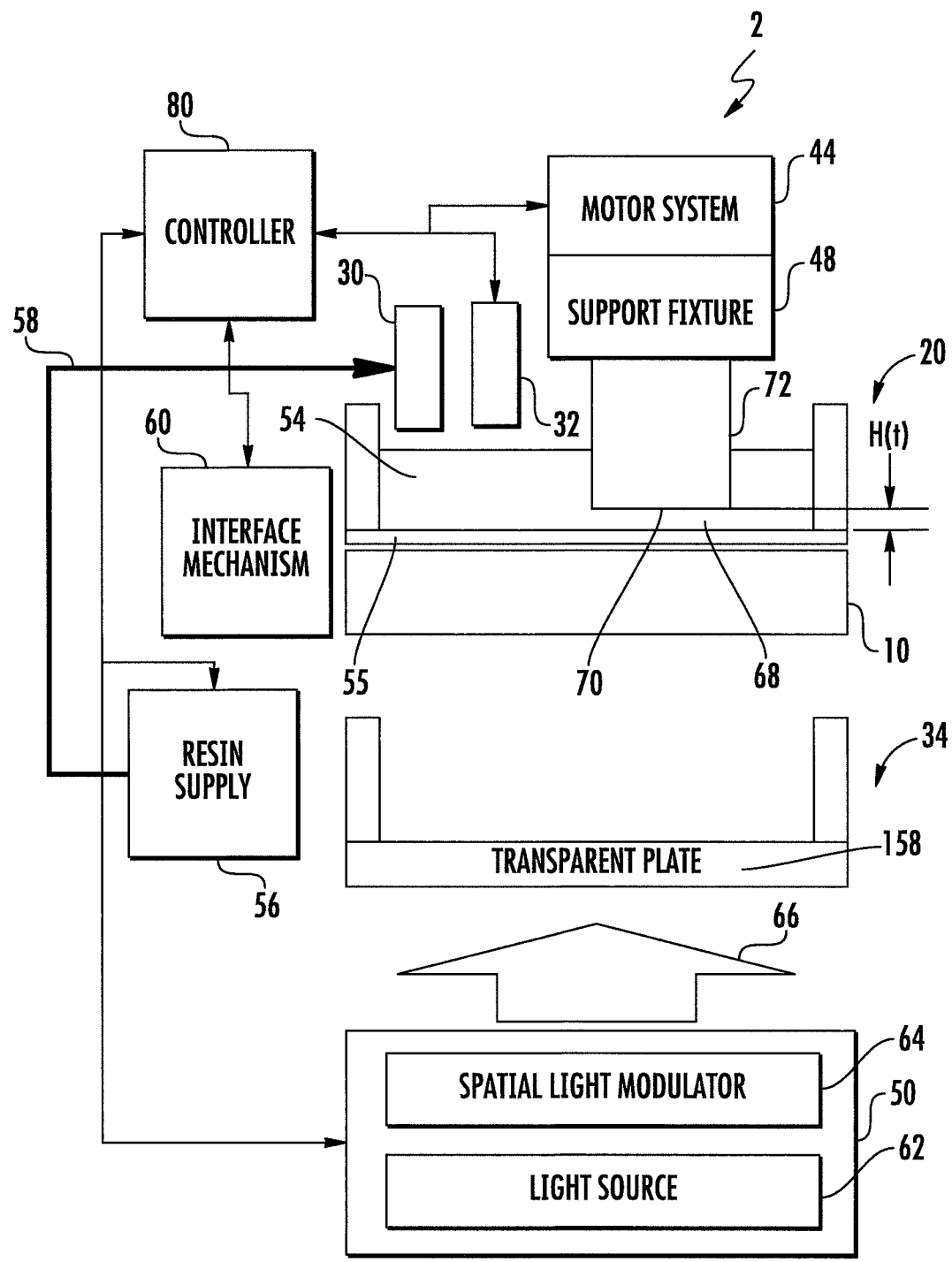
FIG. 2A is a schematic block diagram of an exemplary three dimensional printing system.

FIG. 2A is a block diagram schematic of the three dimensional printing system 2 including some mechanical features and a simplified electrical block diagram. The resin vessel 20 is shown containing resin 54. Resin vessel 20 includes a transparent sheet 55 which defines a lower bound for the resin 54 in vessel 20. The resin is being supplied from resin supply 56 and along a resin supply path 58 to the resin fluid outlet 30. An interface mechanism 60 is configured to controllably latch the resin vessel 20 to the support plate 10 and to position the resin fluid outlet 30 and the fluid level sensor 32 over the resin vessel 20.

Figure 2B:
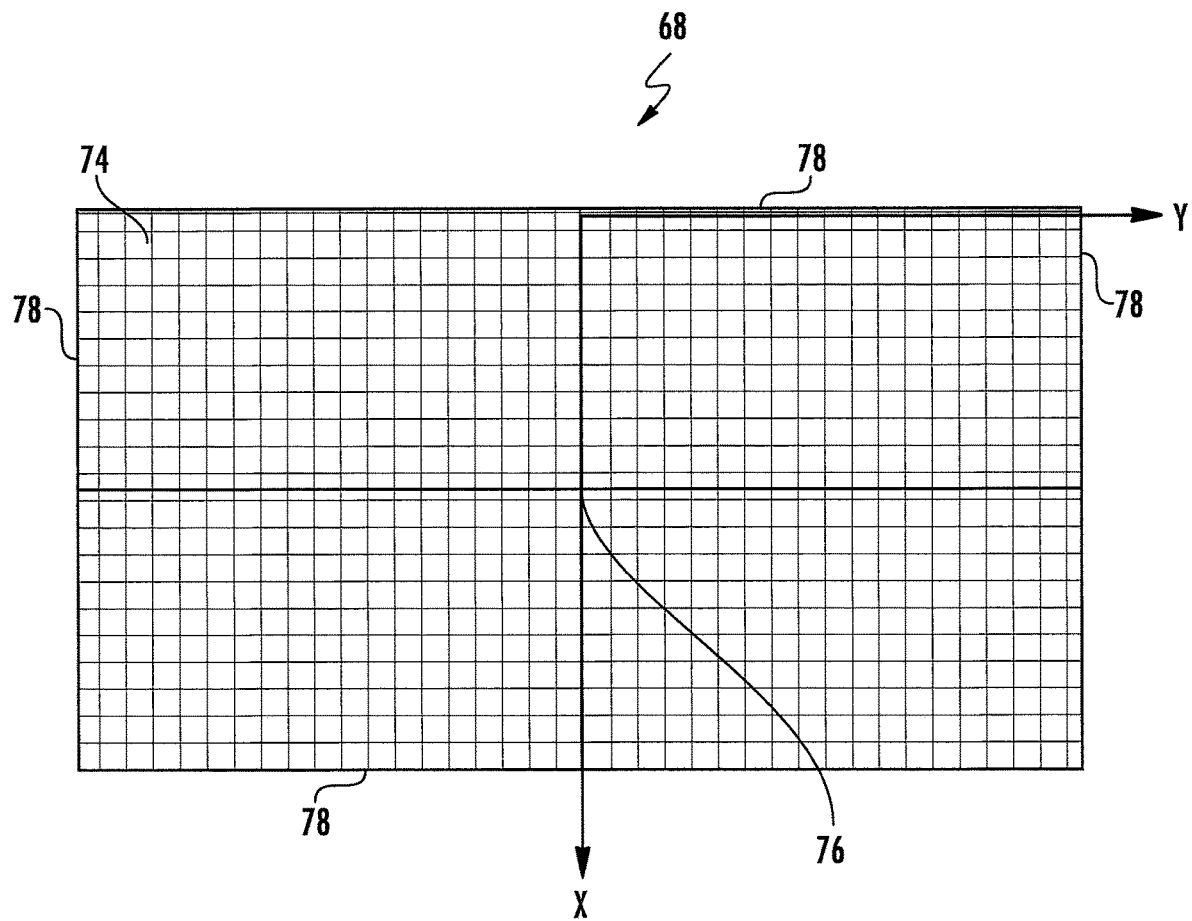
FIG. 2B is an illustration depicting a "build plane" which represents a thin slab of resin being selectively cured by a light engine.

The light engine 50 includes a light source 62 and a spatial light modulator 64. The light engine 50 projects pixelated light 66 up to a "build plane" 68 which is coincident with or proximate to a lower face 70 of a three dimensional article of manufacture 72 being fabricated. Build plane 68 is depicted in FIG. 2B as a two dimensional array of pixels 74. Each pixel 74 corresponds to a pixel element of the spatial light modulator 64.

Build plane 68 defines a lateral addressable extent of the light engine 50 within the resin vessel 20. The build plane 68 is actually a very thin slab or "slice" of resin with lateral dimensions in X and Y and a small vertical thickness. This slab of resin is selectively cured based upon a "slice" of data that is processed and sent to the spatial light modulator 64. The build plane 68 slab does not touch the transparent sheet 55 because an oxygen, chemical, or other inhibitor is utilized to block polymerization on an upper surface of transparent sheet 55. Each time a portion of the build plane 68 slab is selectively cured, it provides another accretive layer onto the lower face 70 of the three dimensional article of manufacture 72.

The thickness of resin between the lower face 70 and the transparent sheet 55 is important because it provides an optical path for the pixelated light 66. The weight of the resin 54 and other factors can cause the transparent sheet 55 to bulge between a center 76 and edges 78 of build plane 68. Such a bulge will result in variable curing and dimensional variations as a function of a distance from the center 76. To reduce this factor, a unique tensioning mechanism is provided to maintain flatness of the transparent sheet 55.

A controller 80 is controllably coupled to fluid level detector 32, motor system 44, light engine 50, resin supply 56, and interface mechanism 60. Controller 80 includes a processor (not shown) coupled to an information storage device (not shown). The information storage device includes a non-transient or non-volatile storage device that stores software instructions that, when executed by the controller 80, operate (and/or receive information from) fluid level detector 32, motor system 44, light engine 50, resin supply 56, interface mechanism 60, and other portions of three dimensional printing system 2. The controller 80 can be located on one circuit board or distributed among multiple circuit boards throughout the three dimensional printing system 2.

Figure 3A:
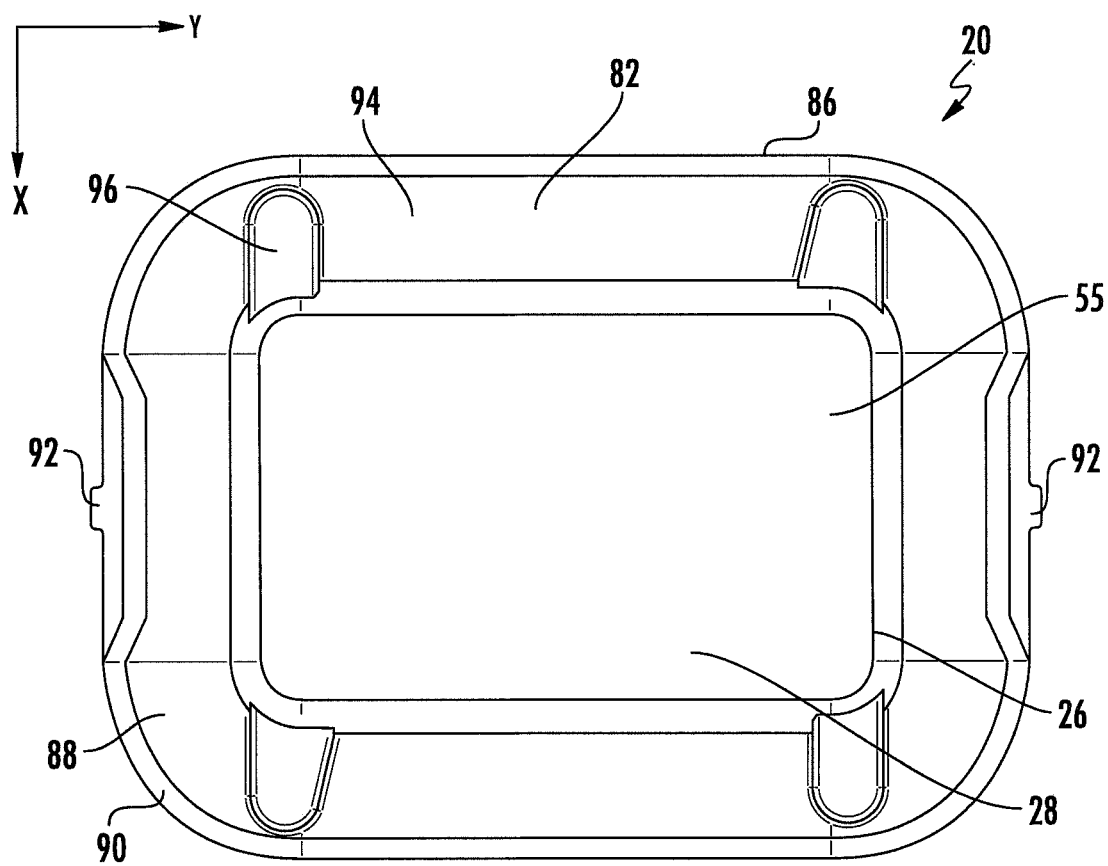
FIG. 3A is a top view of an exemplary resin vessel.
Figure 3B:
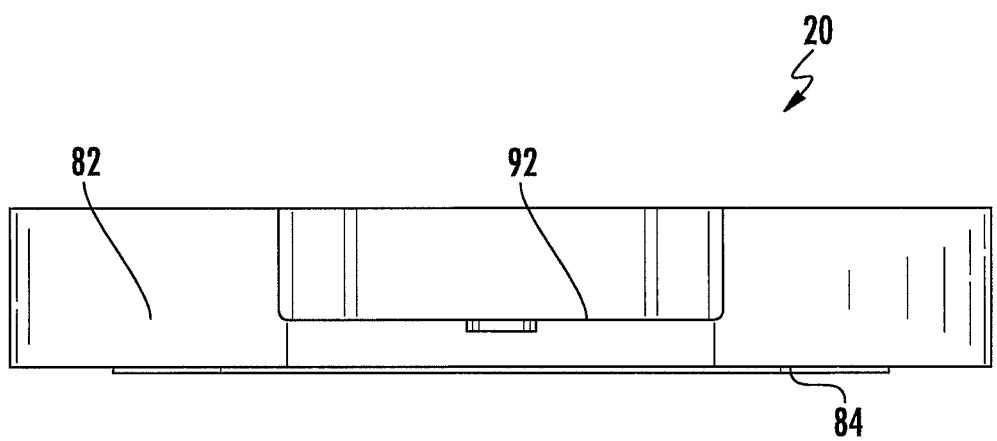
FIG. 3B is a side view of an exemplary resin vessel.
Figure 3C:
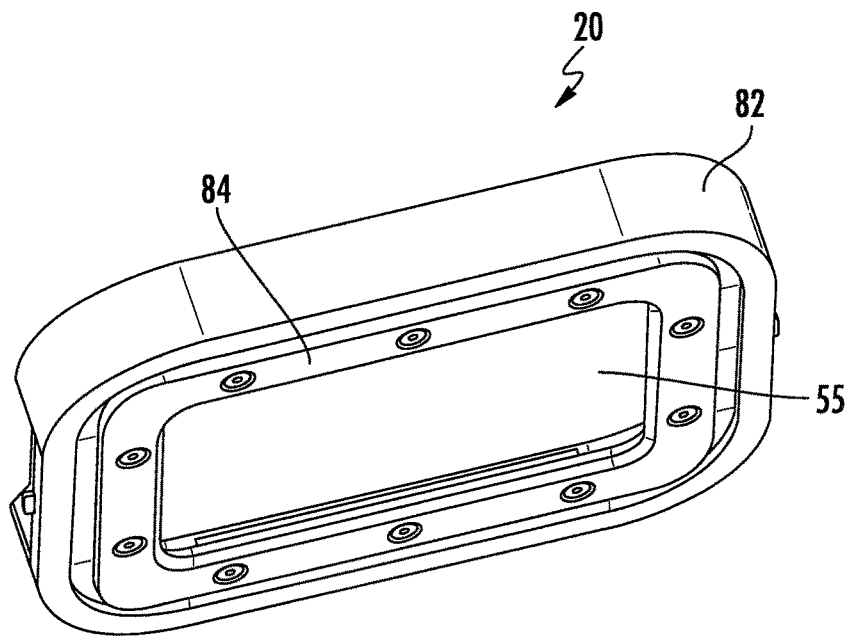
FIG. 3C is an isometric view of a lower side of an exemplary resin vessel.
Figure 3D:
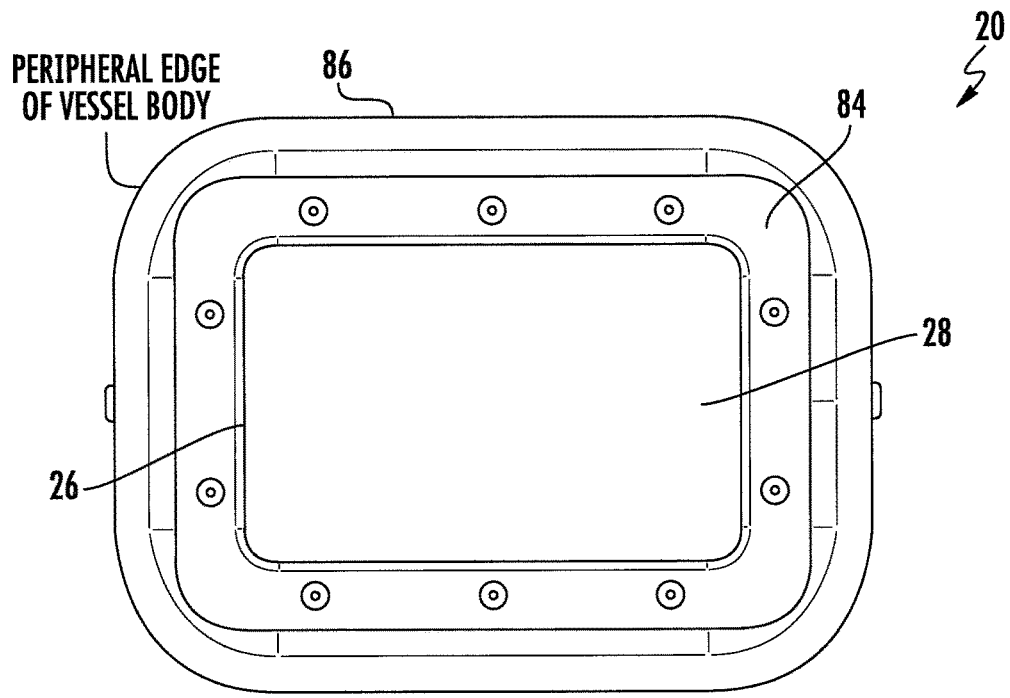
FIG. 3D is a bottom view of an exemplary resin vessel.

FIGS. 3A-D depict views of the resin vessel 20. FIG. 3A is a top view, FIG. 3B is a side view, FIG. 3C is an isometric view, and FIG. 3D is a bottom view of resin vessel 20. The construction of resin vessel 20 includes resin vessel body 82, transparent sheet 55, and retainer 84 that clamps the transparent sheet 55 to the resin vessel body 82.

The resin vessel body 82 has an outer peripheral edge 86 and inner edge 26. Inner edge 26 defines the central opening 28 that is closed on a lower side by the transparent film 55. Resin vessel body 82 includes a sloped surface 88 surrounded by a peripheral wall 90 partly defining the outer peripheral edge 86. Peripheral wall 90 helps to contain the resin 54 contained by the resin vessel 20. The sloped surface 88 allows resin to drain toward the central opening 28.

Resin vessel body 82 has a pair of opposing latch features 92 that are in opposing locations with respect to the lateral axis Y. Formed into the sloped surface 88 of the vessel body 82 is a channel 96 for receiving resin 54 from the resin fluid outlet 30.

Figure 4:
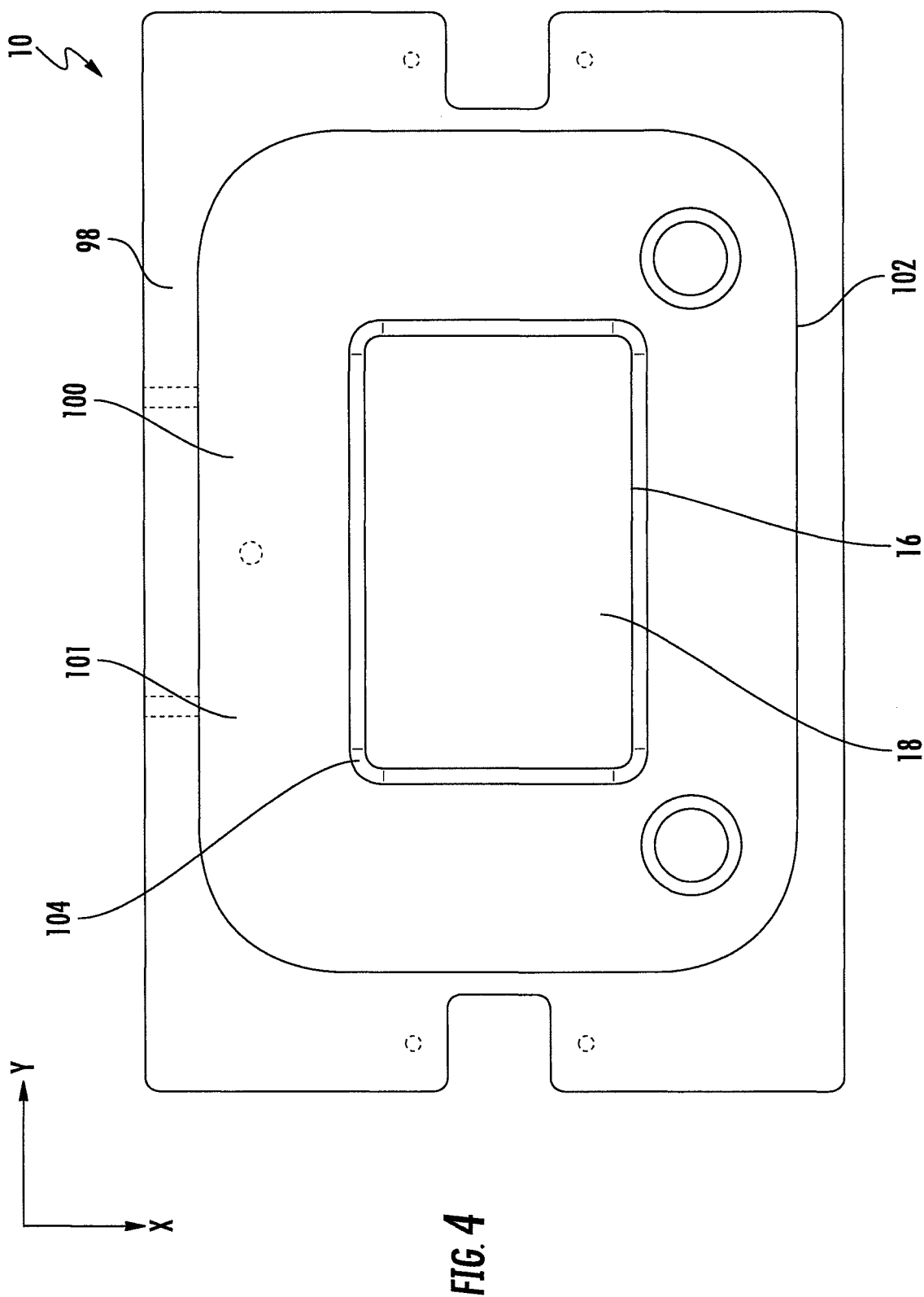
FIG. 4 is a top view of an exemplary support plate.

FIG. 4 is a top view depicting the support plate 10. Support plate 10 includes an upper surface 98 including a recessed surface 100 bounded by an inwardly facing wall 102. When the resin vessel 20 is loaded onto the upper surface 98 of support plate 10, a lower portion of resin vessel 20 is partially received into a recess 101 defined between the inwardly facing wall 102 and a raised ridge 104 that rises above the recessed surface 100. The resin vessel 20 is aligned to the support plate 10 by engagement between the outer peripheral edge 86 and the inwardly facing wall 102.

Extending above the recessed surface 100 is raised ridge 104. When the resin vessel 20 is loaded onto the support plate 10, the raised ridge 104 engages a lower surface of the transparent sheet 55, thereby laterally tensioning the transparent sheet 55. The engagement between the peripheral edge 86 and the inwardly facing wall 102 aligns the raised ridge 104 relative to the inner edge 26 of central opening 28 of resin vessel 20. Aligned, the raised ridge 104 is disposed at a substantially constant distance from the inner edge 26. Simultaneously the central opening 28 of the resin vessel is aligned relative to the central opening 18 of the support plate 10. In the illustrated embodiment the raised ridge 104 defines at least part of the inwardly facing surface or edge 16 that bounds and defines the central opening 18.

Figure 5A:
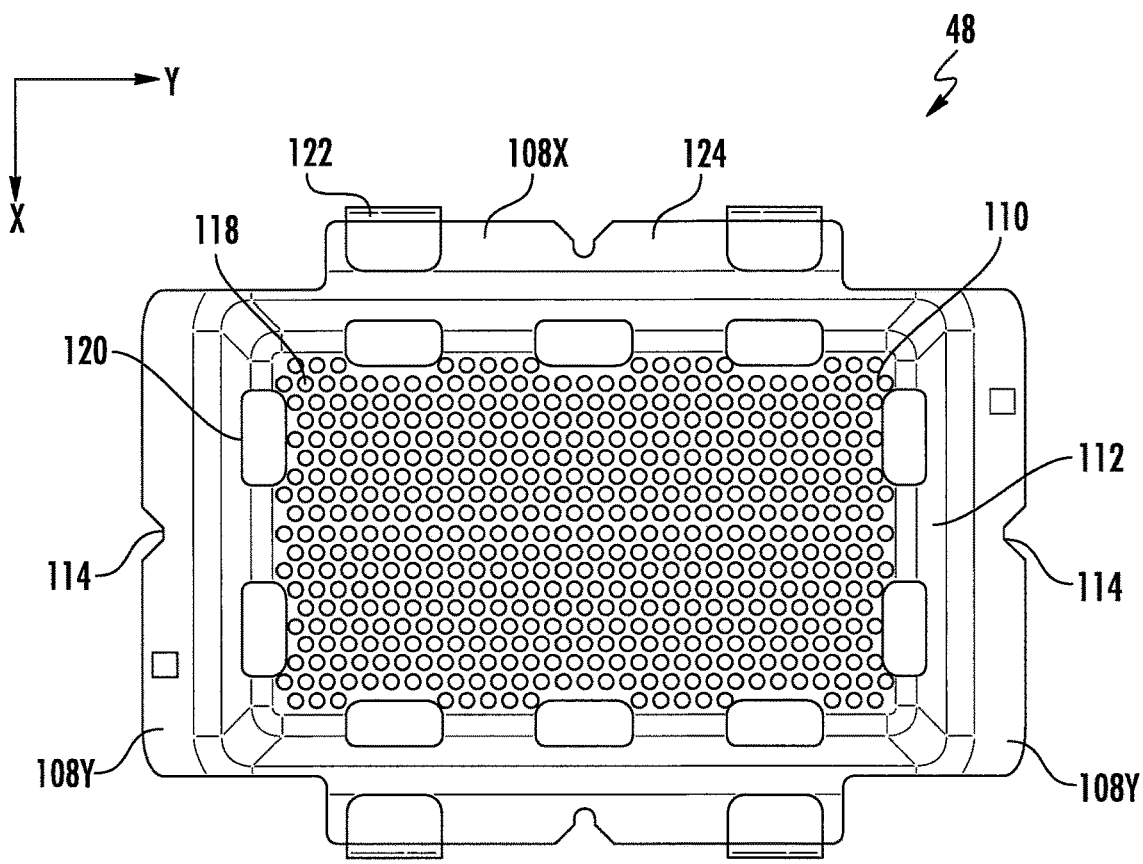
FIG. 5A is a top view of an exemplary support fixture.
Figure 5B:
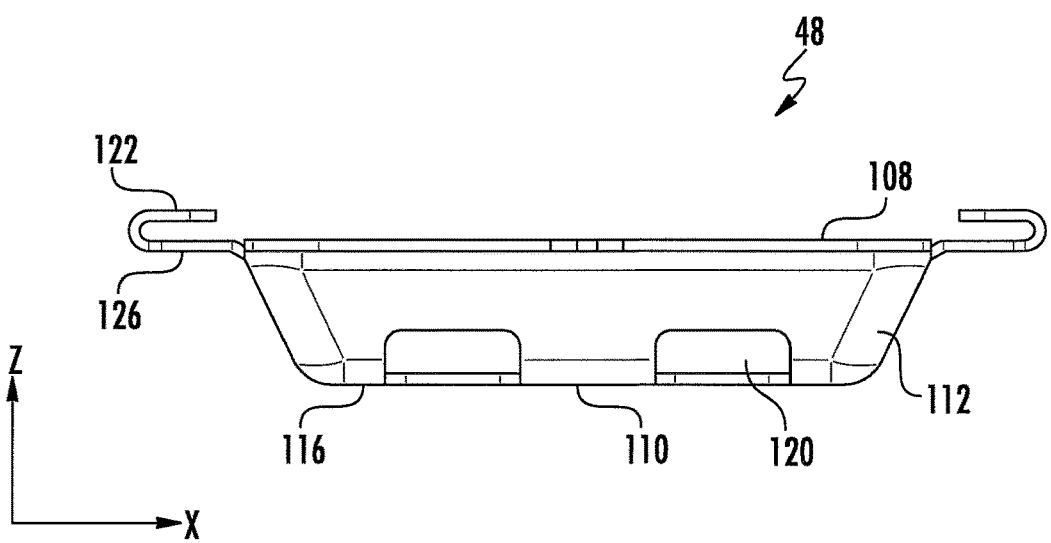
FIG. 5B is a side view of an exemplary support fixture.

FIGS. 5A and 5B depict a first embodiment of the support fixture 48. FIG. 5A is a top view and FIG. 5B is a side view. Support fixture 48 includes an upper portion 108, a lower planar portion 110, and a side wall 112 coupling the upper portion 108 to the lower planar portion 110.

The upper portion 108 includes portions 108X that extend along the lateral X axis and portions 108Y that extend along the lateral Y axis. The portions 108Y are for supporting the support fixture 48 between the receiving arms 46. Each 108Y portion includes a datum feature 114 for receiving and aligning to pins that extend upwardly from the receiving arms 46. The portions 108Y are also made of a magnetic material that is held down by magnets embedded in receiving arms 46. In an illustrative embodiment the entire support fixture 48 is formed from a magnetic material. When the support fixture 48 is being raised, the receiving arms 46 provide support in an upper direction because the receiving arms 46 press upwardly on the portions 108Y. When the support fixture is lowered whereby lower planar portion 110 is passing into resin 54, the magnetic interaction between the upper portion 108 and the receiving arms 46 provides a downward force that secures the support fixture 48 to the receiving arms 46.

The lower planar portion 110 has a lower surface 116 upon which the three dimensional article of manufacture 72 is formed. Formed into the lower planar portion 110 is a dense array of small openings 118. A primary purpose of the small openings 118 is to reduce a fluid drag just before and at the start of forming the three dimensional article of manufacture 72. Before forming the three dimensional article of manufacture 72, the lower surface 116 is moved through the resin 54 and very close to the transparent sheet 55. As the lower surface 116 approaches the transparent sheet 55, resin is displaced and must flow laterally from between the lower surface 116 and the transparent sheet 55. Without such openings 118 the force exerted on the transparent sheet 55 can be large enough to bulge or even damage the transparent sheet 55.

Figure 5C:
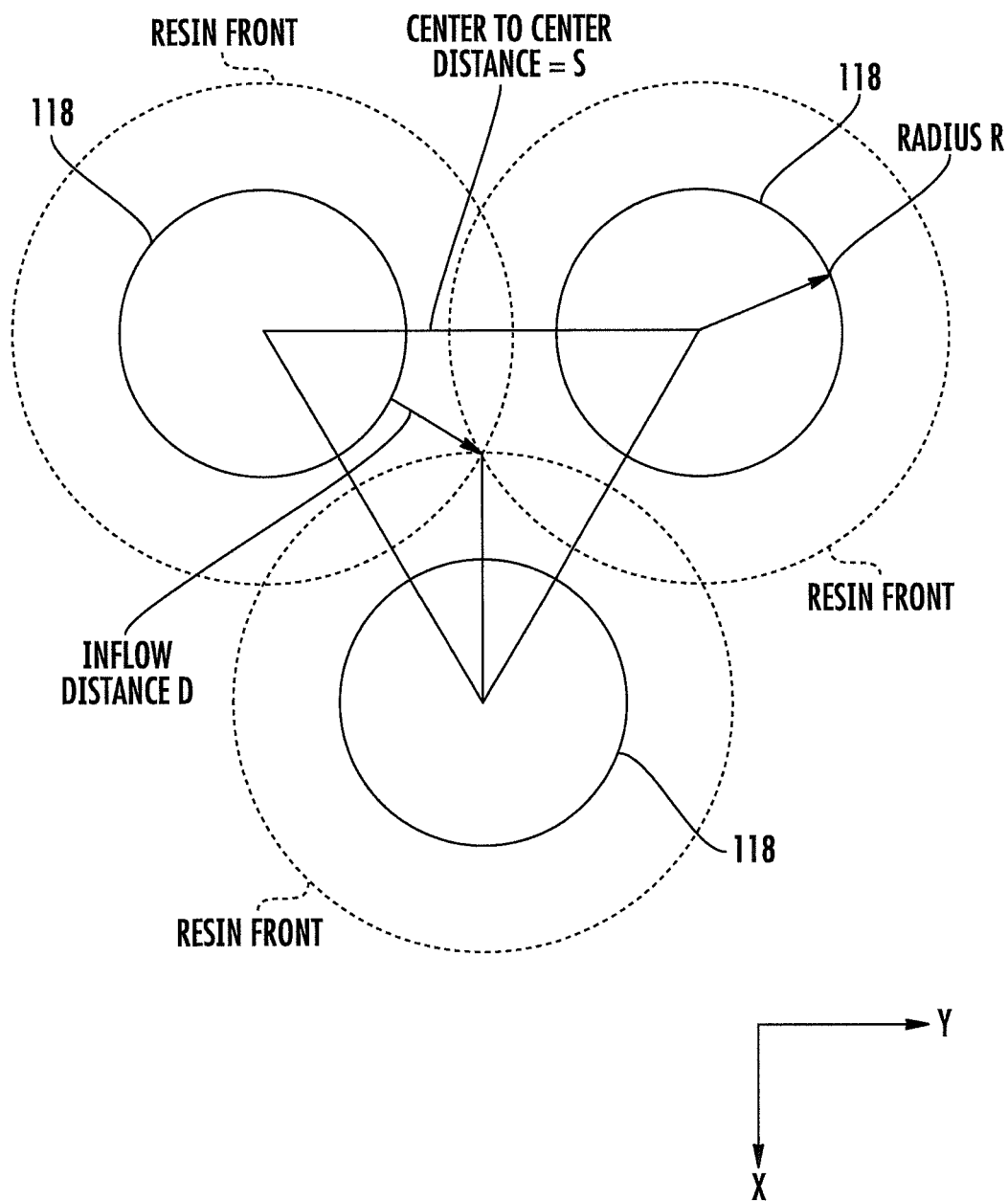
FIG. 5C is a diagram illustrating an "inflow distance" of resin flowing through openings in the support fixture.

The openings 118 allow the resin 54 to escape vertically through the lower planar portion 110 of the support fixture 48. But there is still a vertical force being exerted upon the transparent sheet 55. This vertical force varies positively with an "inflow distance" D. FIG. 5C illustrates the inflow distance D between three small openings 118. The inflow distance D is a geometric parameter that varies monotonically with a vertical force that is indirectly exerted between the lower surface 116 and the transparent sheet 55 by the thin layer of resin 54 therebetween.

The inflow distance D is geometrically defined as the distance that resin must flow out of an opening 118 between the transparent sheet 55 and the lower surface 116 before the entire lower surface 116 is covered with resin. This occurs when the dashed circles representing a "resin front" flowing out of the circles close all uncovered gaps. This therefore occurs when the resin fronts intersect at a midpoint between the arrangement of the three openings 118.

Defining some terms: S=the center to center distance between the openings along Y. R=opening radius. D=the inflow distance between an edge of the opening and the midpoint between the openings. Using geometry, the result is that $D=S/\sqrt{3}-R$ for this arrangement of openings.

For a particular example, the center to center distance S is 4.5 millimeters. The opening radius R is 1.5 millimeters. Then the inflow distance D is about 1.1 millimeters (rounding to the first significant figure).

Preferably the dense array of small openings 118 cover the entire area of the build plane 68 in order to minimize a vertical force exerted on the transparent sheet 55. In one embodiment the dense array of small openings 118 includes at least 100 small openings 118. In another embodiment the dense array of small openings 118 includes at least 200 small openings 118.

In some embodiments the inflow distance is less than 3 millimeters. In other embodiments the inflow distance is less than 2 millimeters. In yet other embodiments the inflow distance is less than 1.5 millimeters.

The small openings 118 are the primary feature in reducing fluid drag and force on the transparent sheet 55 just before and at the beginning of forming the three dimensional article of manufacture 72 (and/or when lower surface 116 is moving vertically through resin proximate to the upper surface of the transparent sheet 55). As the three dimensional article of manufacture 72 is being formed, the distance between the lower surface 116 and the transparent sheet 55 increases and the effect of the openings 118 decreases.

Formed along the side wall 112 are a plurality of large openings 120. The large openings 120 reduce the fluid drag of the resin 54 as the lower planar portion 110 of the support fixture 48 is being raised or lowered in the resin 54. During fabrication of a three dimensional article of manufacture 72 the large openings 120 become a greater factor than the smaller openings 118 in reducing fluid drag when a sufficient portion of the three dimensional article of manufacture 72 is formed. The large openings 120 also provide the function of allowing residual resin 54 to drain from the support fixture 48 when the lower planar support portion 110 is lifted out of the resin 54 in resin vessel 20.

The large openings 120 reduce a fluid pressure difference between the resin 54 inside the side wall 112 of the support fixture 48 and outside the side wall 112 as the lower planar portion is being raised and lowered within the resin 54. As the lower planar portion 110 is being lowered into the resin 54, the large openings 120 allow resin to flow into the space above the lower planar portion 112. As the lower planar portion 110 is being raised, the large openings allow the resin to flow out of the space above the lower planar portion 112.

According to the illustrated embodiment the large openings 120 are distributed to surround the dense array of small openings 118. The large openings are at least partially formed into the side wall 112. In some embodiments, individual large openings 120 span the side wall 112 and an edge of the lower support portion 110. In one embodiment a large opening 120 has a cross sectional area equal to at least a plurality of the cross sectional area of one small opening 118. In another embodiment the large opening 120 has a cross sectional area equal to at least five times the cross sectional area of one small opening 118. In another embodiment the large opening 120 has a cross sectional area equal to at least ten times the cross sectional area of one small opening 118.

The side wall 112 is preferably angled relative to vertical axis Z to enable a nested stacking of the support fixtures 48. This enables a stack of support fixtures 48 to be loaded into a magazine for automated loading into a printing system 2. In one embodiment the angle of the side wall 112 relative to the vertical axis Z is in a range of 10 to 50 degrees. In another embodiment the angle of the side wall 112 relative to the vertical axis Z is in a range of 20 to 40 degrees. In yet another embodiment the angle of the side wall 112 relative to the vertical axis Z is in a range of 25 to 35 degrees. In a further embodiment the angle of the side wall 112 relative to the vertical axis Z is about 30 degrees. There is a tradeoff in the angle. As the angle increases, a required area of the support fixture 48 and resin vessel 20 increases for a given area of a build plane 68. Thus, a minimal angle may seem optimized. However as the angle decreases, vertical stacking efficiency of the support fixtures 48 decreases. Therefore an angle of about 30 degrees from vertical is roughly an optimal tradeoff for vertical stacking efficiency versus size.

The portions 108X of the upper portion 108 that extend along the X axis include a plurality of bent tabs 122 that extend above an upper planar surface 124 of the portions 108X. The bent tabs 122 are for engaging a lower planar surface 126 of the portions 108X to provide a controlled vertical spacing between stacked support fixtures 48. In the illustrative embodiment an individual bent tab 122 is bent into a U-shape whereby an end of the tab 122 faces inwardly.

Figure 6:
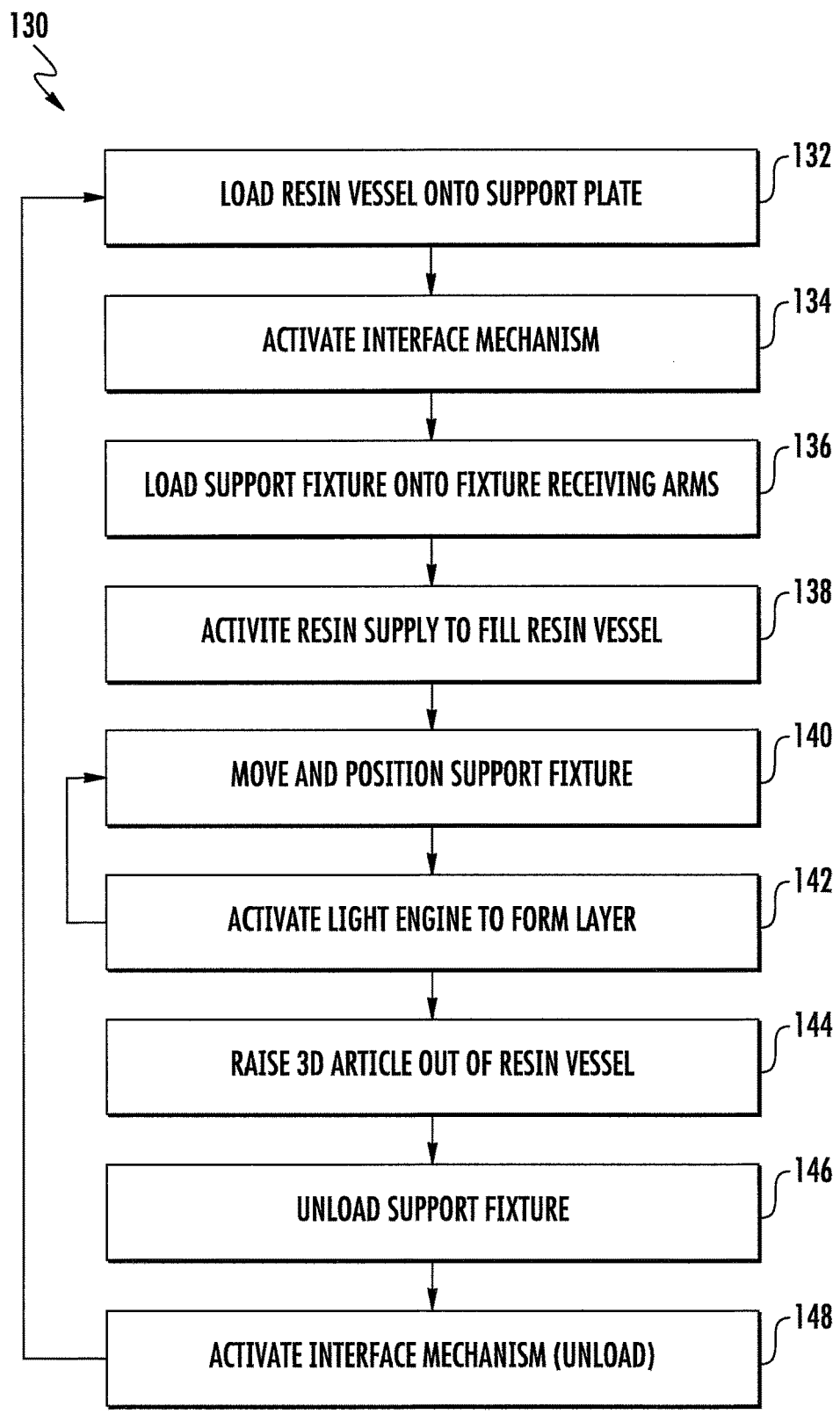
FIG. 6 is a flowchart depicting an exemplary method of manufacturing a three dimensional article of manufacture.

FIG. 6 is a flowchart representing a manufacturing method 130 for using printing system 2 to fabricate a three dimensional article of manufacture 72. Some individual steps of method 130 will also be described and/or illustrated with respect to subsequent figures in added detail. Also, some of the earlier figures pertain to method 130. Most or all of the steps of method 130 can be under control of the controller 80. For steps 132, 136, and 146 any or all of these can be performed either manually or with a robotic arm under control of the controller 80. Remaining steps 134, 138-144, and 148 can be controlled by the controller 80.

According to step 132, the resin vessel 20 is loaded onto support plate 10. According to step 134, the interface mechanism 60 is activated to secure the resin vessel 20 to the support plate 10 and to position the resin fluid outlet 30 and the fluid level sensor 32 over the resin vessel 20. According to step 136, the support fixture 48 is loaded onto the fixture receiving arms 46. In some embodiments step 136 is performed before step 134 and/or before step 132.

According to step 138, the resin supply 56 is activated whereby the resin supply 56 supplies resin to the resin vessel 20. According to this step the controller 80 utilizes the fluid level sensor 32 to monitor a fluid level of the resin 54 in the resin vessel 20. The controller 80 activates the resin supply 56 to pump resin 54 through the supply path 58 and out the resin fluid outlet 30 until a proper level of resin 54 is present in resin vessel 20. During subsequent steps, the controller 80 can continue to monitor information from the fluid level sensor 32 and operate the resin supply 56 to maintain a proper level of resin in the resin vessel 20.

According to step 140, the motor system 44 operates the lead screw 42 to translate the carriage 40 whereby the lower surface 116 of support fixture 46 is positioned at an operating distance from the transparent sheet 55. According to step 142, the light engine 50 is activated to selectively polymerize a layer of the resin onto the lower surface 116. Steps 140 and 142 are repeated until the entire three dimensional article of manufacture 72 is formed. As a note, when step 140 is repeated, it is the lower face 70 of the three dimensional article of manufacture 72 that is positioned at the operating distance from the transparent sheet 55.

According to step 144, the motor system 44 is operated to raise the three dimensional article of manufacture 72 out of the resin 54. According to step 146 the support fixture 48 is unloaded from the receiving arms 46. According to step 148, the interface mechanism 60 is operated to move the resin fluid outlet 30 and the fluid level sensor 32 from above the resin vessel 20. Also according to step 148 the resin vessel 20 is unlatched so that it can be removed from the support plate 10.

As a note various alternative embodiments are possible. For example, step 148 can be skipped and the process can proceed to step 136 whereby another support fixture 48 is loaded for forming another three dimensional article of manufacture 72 with the same resin vessel 20. Thus, the depicted method 130 is illustrative and lends itself to certain variations.

Figure 7A:
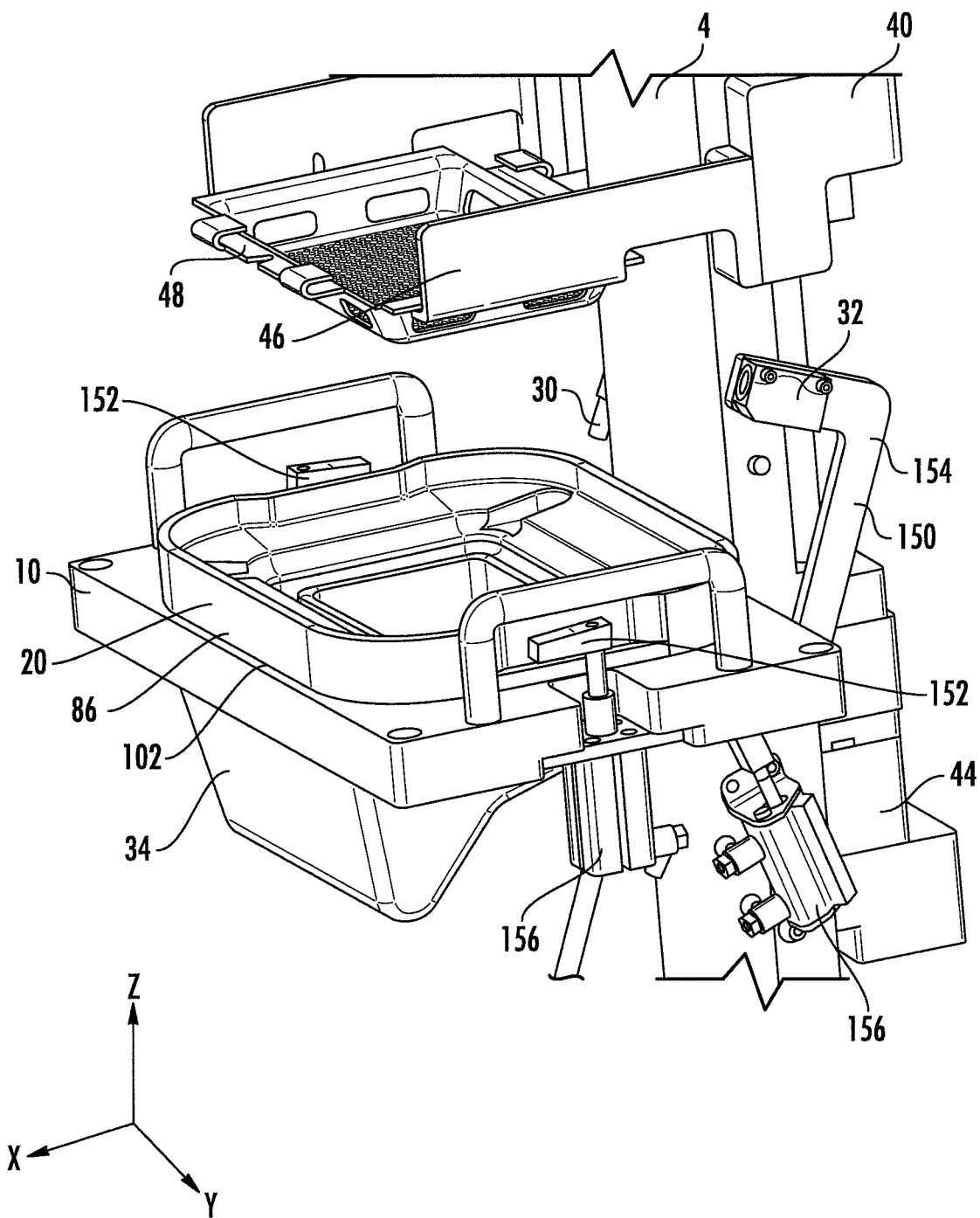
FIG. 7A is an isometric drawing depicting loading a resin vessel onto a support plate with an interface mechanism in a non-operating state.

FIGS. 7A-D are isometric views depicting loading and securing the resin vessel 20 and the fluid spill containment vessel 34 to the support plate 10. FIG. 7A depicts step 132 of FIG. 6. The resin vessel 20 has been loaded onto the support plate 10. A lower portion of resin vessel 20 has been received into the recess 101 (see also FIG. 4). Engagement of the peripheral edge 86 and the inwardly facing wall 102 has provided lateral (X and Y) alignment of the resin vessel 20 with respect to the support plate 10.

Also shown in FIG. 7A is a resin handling module 150 that supports both the resin fluid outlet 30 and the fluid level sensor 32 with arms 154. The resin handling module 150 is configured to rotate about an axis parallel to lateral axis Y. In FIG. 7A the resin handling module 150 is shown in a non-operating position whereby the resin fluid outlet 30 and the fluid level sensor 32 are not in position over the resin vessel 20. Latches 152 are also shown in a non-engaged position.

Figure 7B:
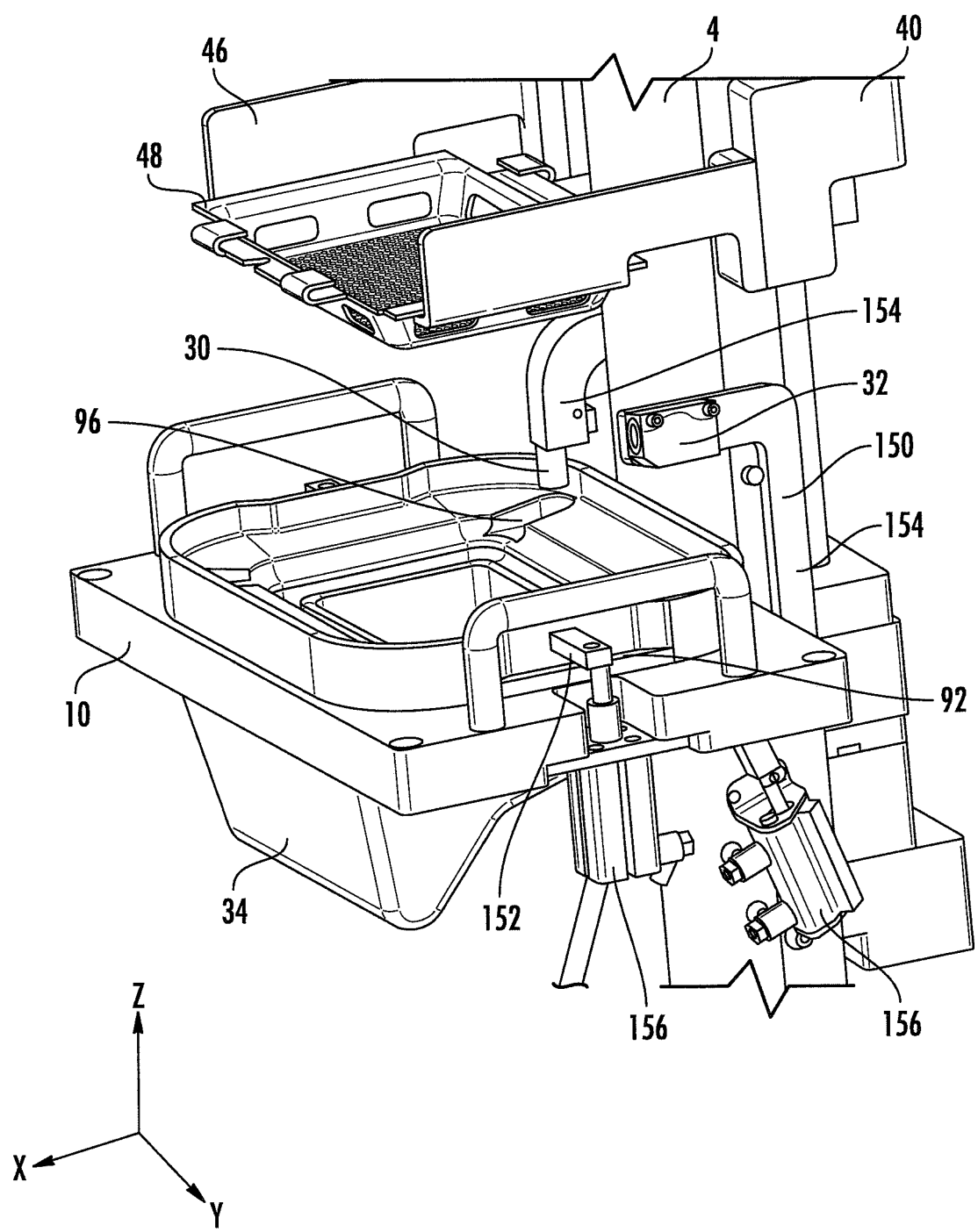
FIG. 7B is an isometric drawing depicting loading a resin vessel onto a support plate with an interface mechanism in an operating state.

FIG. 7B depicts step 134 of FIG. 6. Between FIGS. 7A and 7B the resin handling module 150 has been rotated about an axis parallel to lateral axis Y from a non-operating position (FIG. 7A) to an operating position (FIG. 7B). In the operating position the resin fluid outlet 30 and the fluid level sensor 32 are both positioned over the resin vessel 20. Also the latches 152 are engaged with latch features 92 at opposing ends of the resin vessel. The latches 152 exert a downward (−Z) vertical force on the latch features 92 to increase a tension in the transparent sheet 55.

The resin handing module 150 includes two arms 154 that are linked together whereby they rotate together in unison between the non-operating position and the operating position of the resin handling module 150. The interface mechanism 60 that actuates the resin handling module 150 and the latches 152 is configured to simultaneously actuate them to move them back and forth between a non-operating state (non-operating position of resin handling module 150 and latches 152 not engaged) to an operating state (operating position of resin handling module 150 and latches 152 engaged).

Figure 7C:
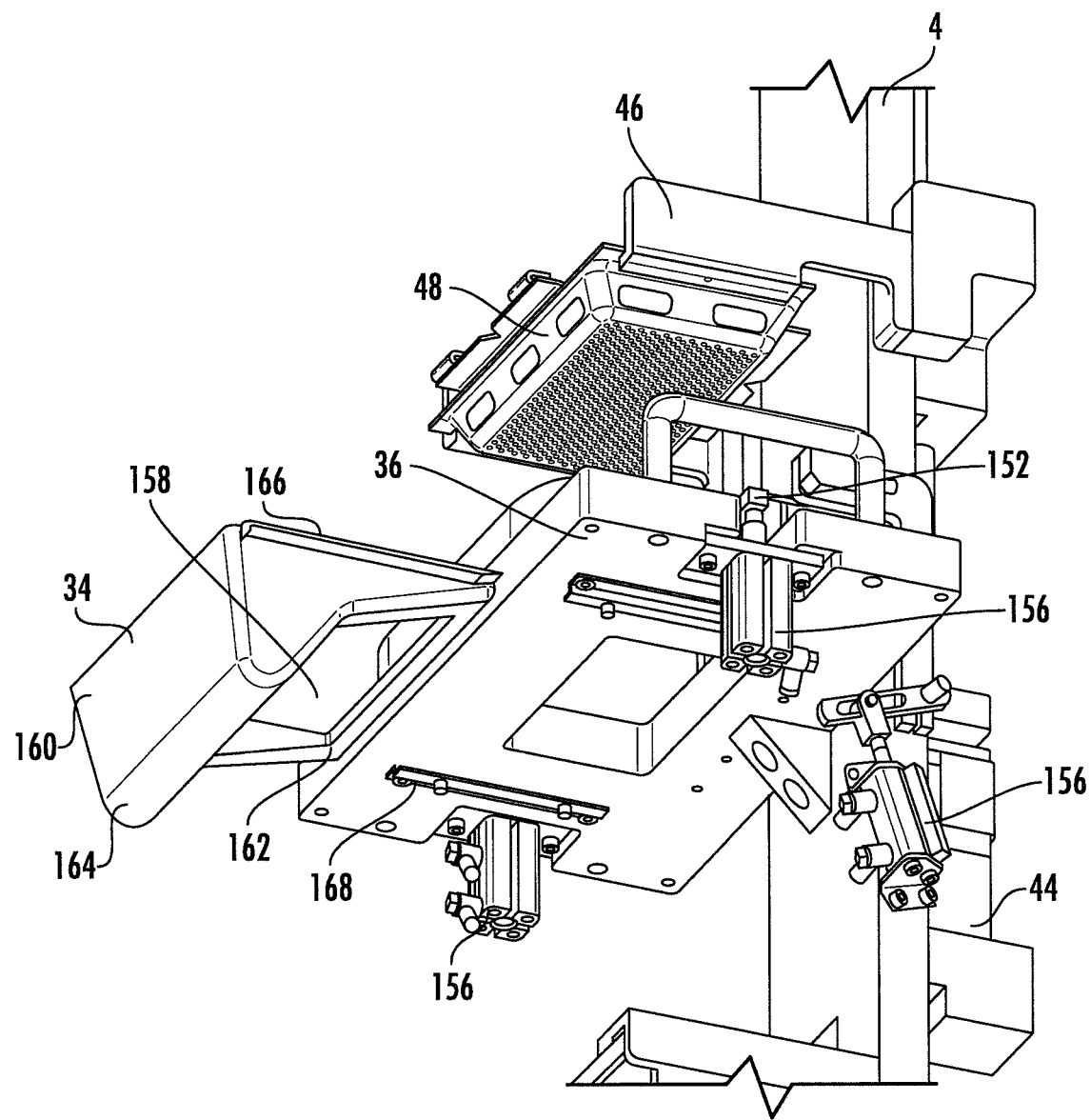
FIG. 7C is an isometric drawing depicting a fluid spill containment vessel about to be loaded onto a lower side of a support plate.

In the illustrative embodiment, the interface mechanism 60 includes pneumatic actuators 156. FIG. 7C depicts a more complete view of the pneumatic actuators 156 (shown without air "plumbing"). There is a pneumatic actuator 156 coupled to each latch 152 and a pneumatic actuator 156 coupled to the resin handling module 150. The air pressure applied to the pneumatic actuators 156 enables motion of the resin handling module 150 and latches 152 to be simultaneous.

The resin vessel 20 is unloaded in reverse order of being loaded. This includes (1) changing the interface mechanism 60 from an operating to a non-operating state—going from FIG. 7B to FIG. 7A, and then (2) unloading the resin vessel 20 from the support plate 10.

Figure 7D:
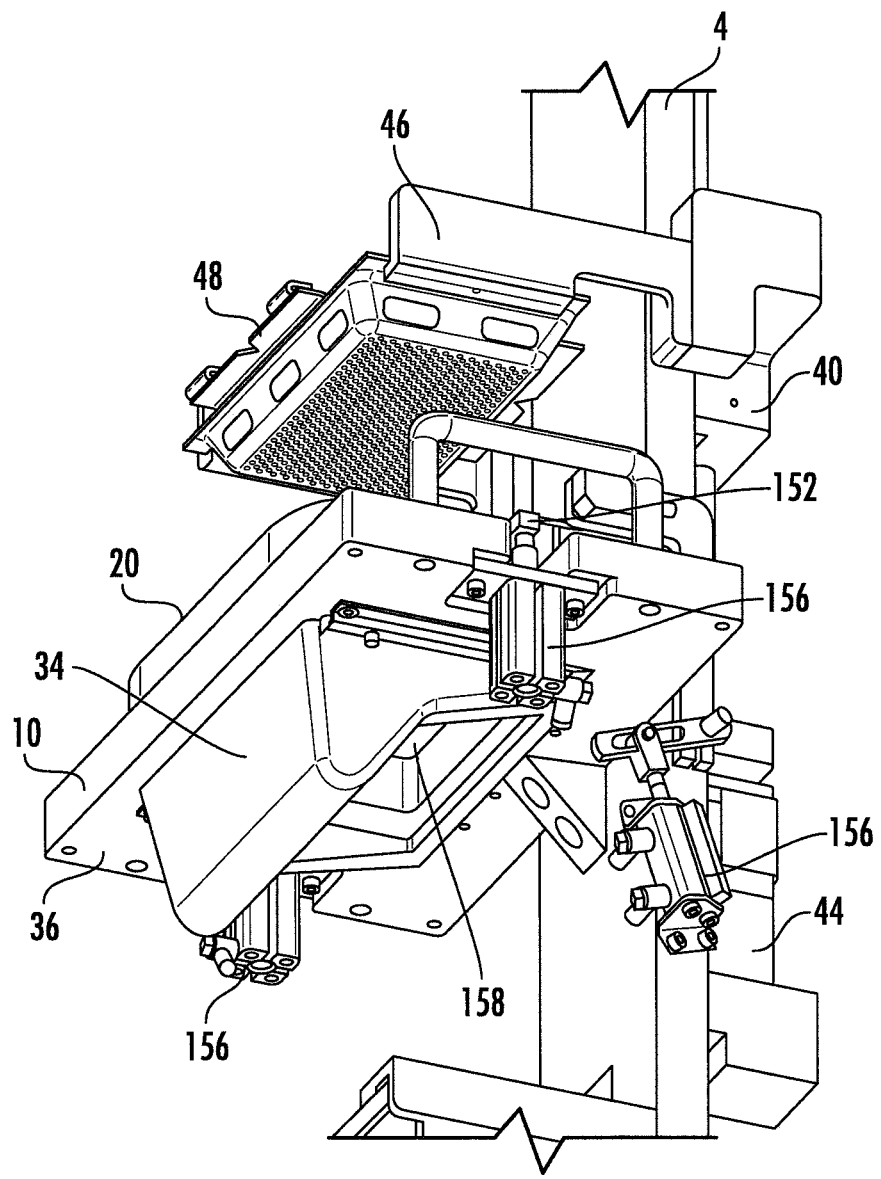
FIG. 7D is an isometric drawing depicting a fluid spill containment vessel loaded onto a lower side of a support plate.

FIGS. 7C and 7D depict the fluid spill containment vessel 34 being slidingly mounted to the lower side 36 of the support plate 10. The fluid spill containment vessel 34 includes a transparent window 158 for allowing light to pass from the light engine 50 to the resin vessel 20. The fluid spill containment vessel 34 has a generally tapering profile from a distal end 160 to a proximal end 162. The tapering profile provides an internal slope whereby resin can drain away from the transparent window 158 and into a trough 164. This minimizes a tendency for a light path from the light engine 50 to the build plane 68 to be occluded by spilled resin that has accumulated in the fluid spill containment vessel 34.

The fluid spill containment vessel 34 has a pair of opposing upper lips 166 that extend outwardly along the lateral Y axis. Mounted to the lower side 36 of support plate 10 are two rails 168 that are aligned with lateral axis X and spaced apart with respect to lateral axis Y. The fluid spill containment vessel 34 is mounted to the support plate 10 by slidingly engaging the rails 168 with the upper lips 166 along the lateral axis Y.

FIGS. 7C and 7D depict disengaged and engaged positions respectively of the fluid spill containment vessel 34 with respect to the support plate 10. In the engaged state, the resin vessel central opening 28, the support plate central opening 18, and the fluid spill containment vessel 34 transparent window 158 are all aligned whereby the light engine 50 can project pixelated light up through them and to the build plane 68.

Figure 8A:
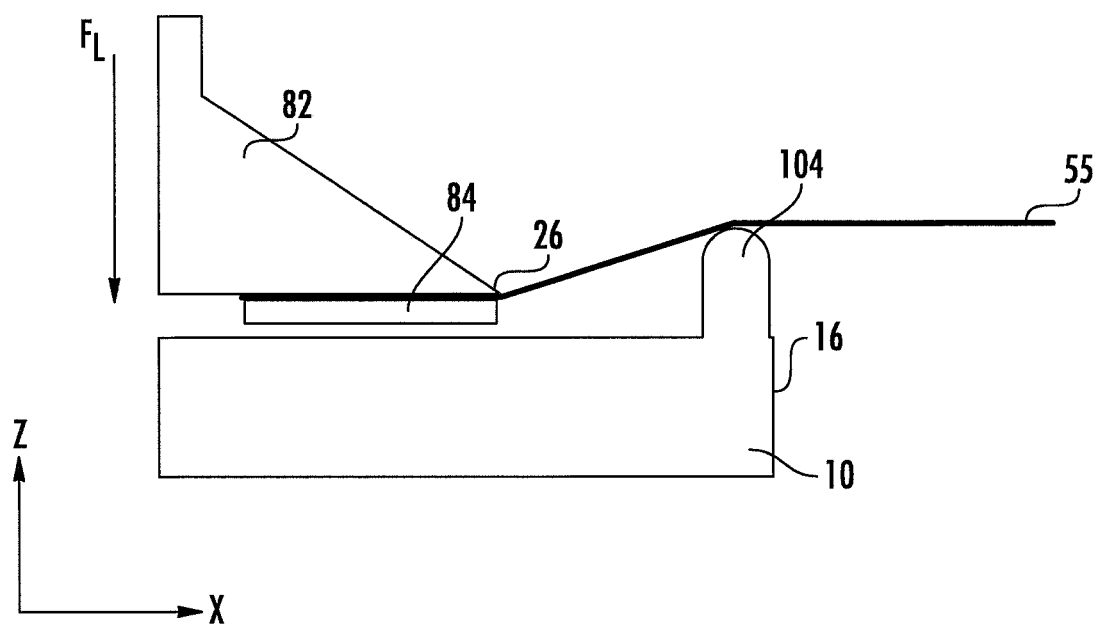
FIG. 8A is a simplified cross sectional schematic illustration of tensioning of a transparent sheet.

FIG. 8A is cross sectional view depicting interaction of components involved in tensioning the transparent sheet 55 during steps 132 and 134 of FIG. 6. When the resin vessel 20 is loaded onto the support plate 10, the raised ridge 104 engages the transparent sheet 55. When the latches 152 engage the latch features 92, they exert a combined downward latch force $F_L$ upon the resin vessel. This has the effect of tensioning the transparent sheet 55. The tension in the transparent sheet 55 can be controlled by controlling the latch force $F_L$.

Figure 8B:
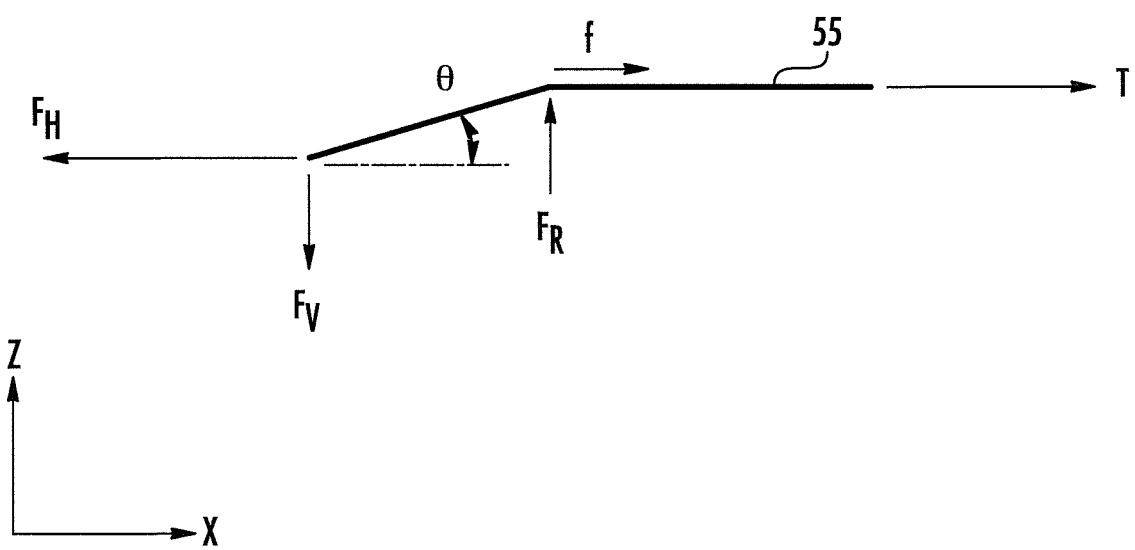
FIG. 8B is a simplified diagram of force exerted on the transparent sheet of FIG. 8A.

FIG. 8B depicts the forces involved: T=Tension in Transparent Sheet 55, $F_H$=Horizontal Force Exerted on Transparent Sheet by Vessel Body 82, f=horizontal frictional force exerted on transparent sheet 55 by raised ridge 104, $F_V$=vertical force exerted on transparent sheet 55 by Vessel Body 82, and $F_R$=Vertical Force Exerted by Raised Ridge 104 on Transparent Sheet 55. Now, $F_V = W_V + F_L$, where $W_V$ is the weight of the resin vessel 20 and $F_L$ is the downward force of both latches. These forces are known.

Summing the forces in X: $T + f = F_H$. Summing the forces in Y: $F_V = F_R$. From geometry the tangent of θ equals $F_V$ divided by $F_H$. From the above relationships, and from computing the frictional force f based a coefficient of friction and $F_R$, the tension T can be approximated in terms of known variables. This diagram is a simplified approximation of the actual system because it is in two dimensions and the actual system would consider the sheet in three dimensions. If the angle θ is small, then the tension T can be quite large relative to the vertical forces applied. There may be a need to increase the vertical force over time to compensate for an increase in angle θ if the transparent sheet 55 stretches. The configuration of FIG. 8A has an advantage that the latch force $F_L$ can be programmably controlled by the controller 80 controlling the air pressure applied to pneumatic actuators 156. Thus, the tension T can be indirectly programmably controlled by the controller 80.

Figure 8C:
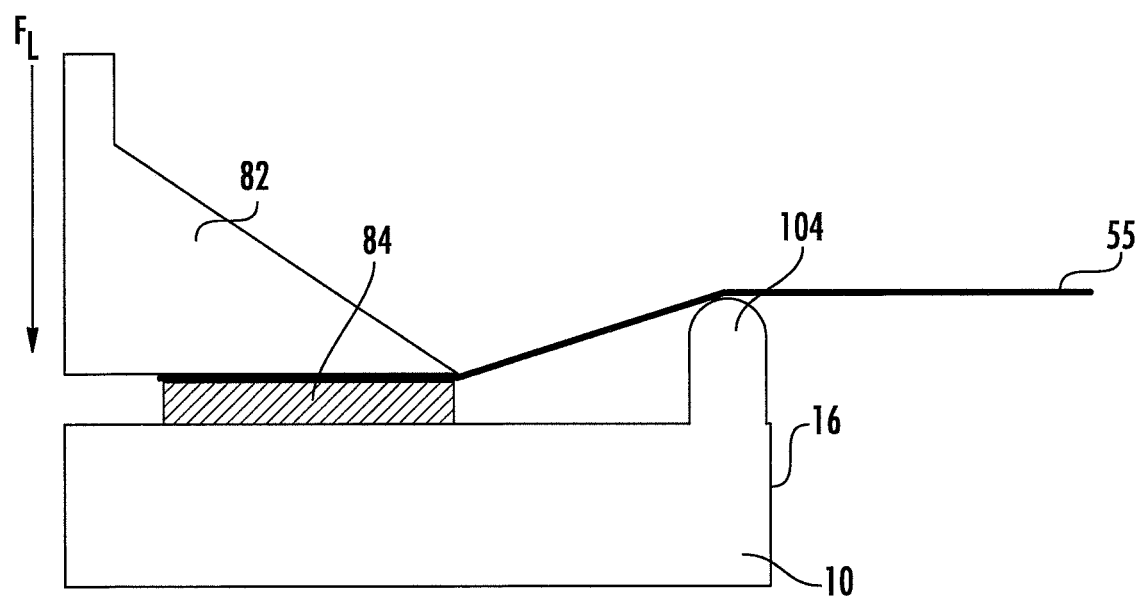
FIG. 8C is a simplified cross sectional schematic illustration of an alternative method of tensioning a transparent sheet.
Figure 8C:
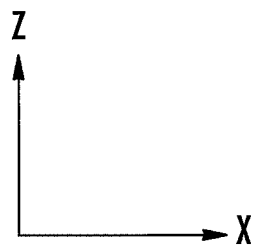

FIG. 8C illustrates an alternative embodiment in which the resin vessel 20 "bottoms out" on the support plate 10. With this embodiment, the tension T in the transparent sheet 55 is governed by a vertical position of the vessel body 82 in relation to the raised ridge 104. In this embodiment, any compression set in the transparent sheet 55 will reduce the tension T. While this embodiment is viable, it would be less desirable than the embodiment of FIG. 8A if the transparent sheet 55 stretches over time and/or if dimensional tolerances are not precisely controlled.

Figure 9:
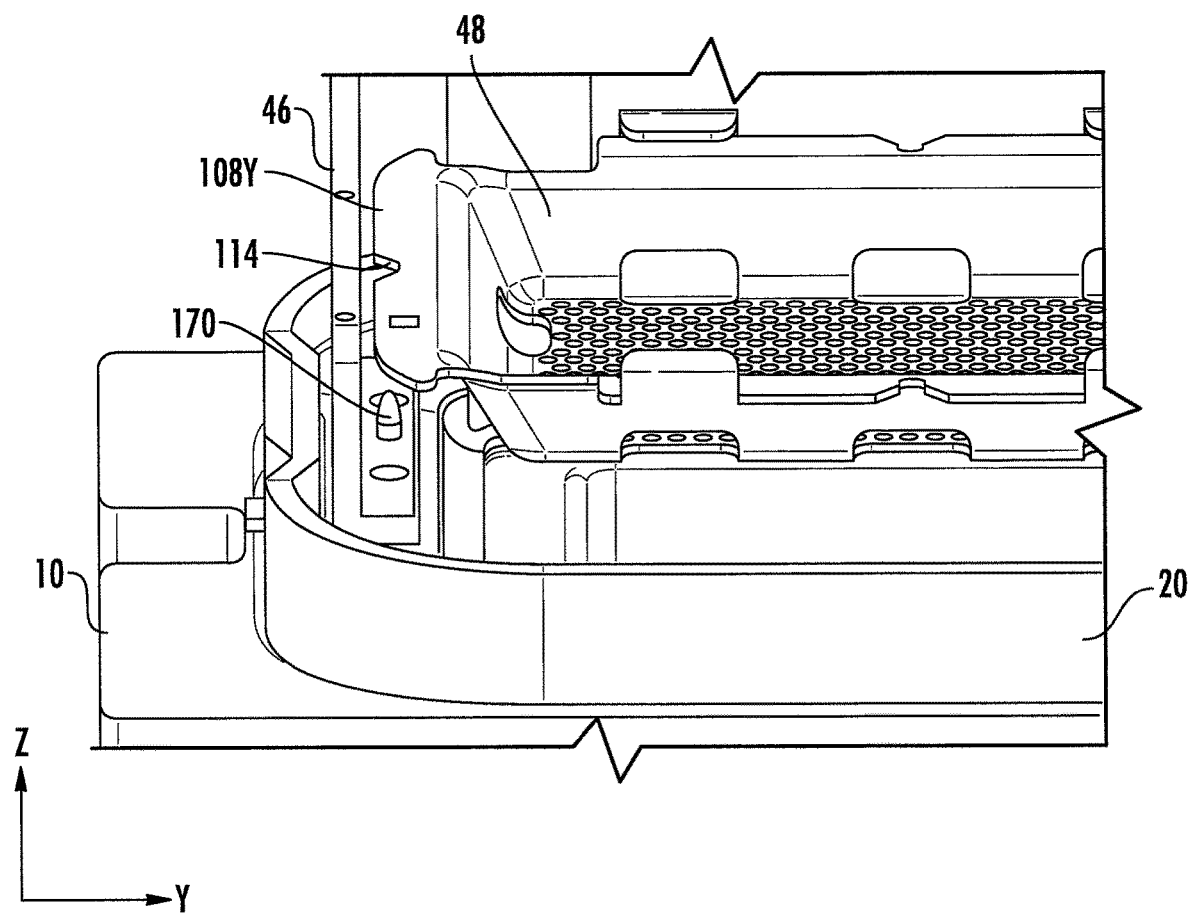
FIG. 9 is an isometric drawing depicting loading a support fixture onto a receiving arm.

FIG. 9 depicts a mechanical interaction between the portion 108Y of the support fixture 48 and receiving arm 46 as the support fixture is loaded according to step 136 of FIG. 6. The receiving arm 46 includes upstanding pin 170 that is received by datum feature 114 for providing lateral alignment of the support fixture 48. Between both support arms the lateral alignment provided includes X, Y, and rotation about the axis Z. The portion 108Y is formed from a magnetic material and receiving arm contains a magnet. The magnetic interaction and mechanical interaction along the vertical axis Z between portions 108Y and the receiving arms provide support along the vertical axis Z and against rotation about the horizontal axes.

Figure 10:
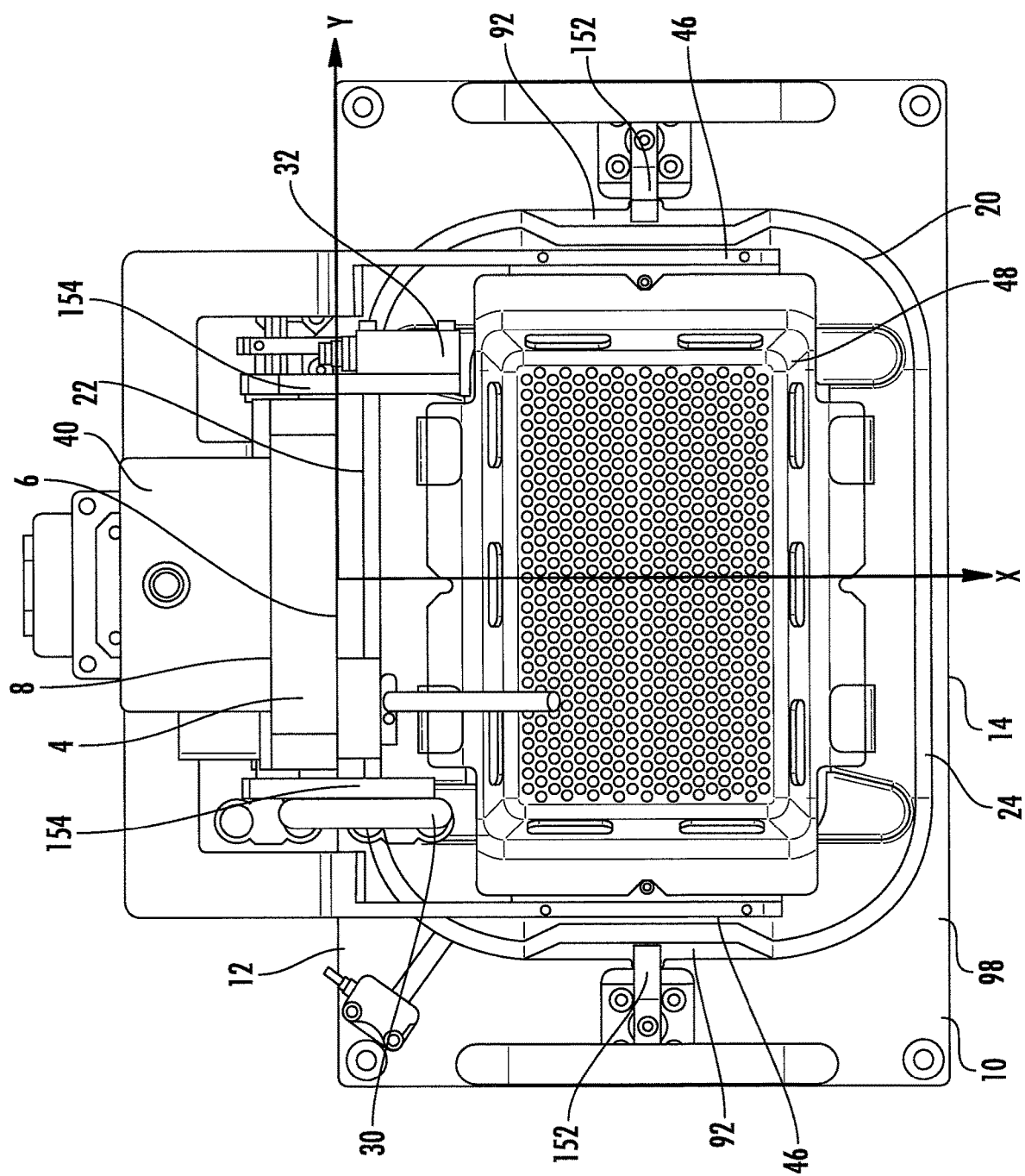
FIG. 10 is a top view of a portion of an exemplary three dimensional printing system with a resin vessel and support fixture installed.

FIG. 10 is a top view of an embodiment of three dimensional printing system 2 with the resin vessel 20 and the support fixture 48 installed. The vertical support 4 has a front side 6 and a back side 8. Extending from the front side 6 is the support plate 10. The support plate 10 extends along lateral axis X from a proximal end 12 (proximate to the front side 6) to a distal end 14.

Resin vessel 20 is disposed above a portion of the upper surface 98 of support plate 10 (held above a recessed portion 100 of the upper surface by the force of the raised ridge 104 upon the transparent sheet 55). The resin vessel 20 has a rear portion 22 that is laterally proximate to the proximal end 12 of the support plate. The resin vessel 20 has a front portion 24 that is laterally proximate to the distal end 14 of the support plate. The resin vessel 20 has a pair of opposed latch features 92 including left and right latch features 92 at opposed ends with respect to the lateral axis Y. Corresponding to the left and right latch features 92 are left and right latches 152.

The interface mechanism 60 (depicted in block diagram form in FIG. 2A) is activated whereby the resin handling module 150 and latches 152 are in an operating state. In the operating state the resin handling module 150 is in an operating position whereby the resin fluid outlet 30 and the fluid level sensor 32 are positioned over the resin vessel 20 and the latches 152 are engaged with the latch features 92 of resin vessel 20. The resin fluid outlet 30 and the fluid level sensor 32 are disposed over the rear portion 22 of the resin vessel 20. The resin fluid outlet 30 and the fluid level sensor 32 are also spaced apart and on either side of the vertical support 4 with respect to the lateral axis Y and each are supported by an arm 154 of the resin handing module 150.

Extending from the back side 8 of vertical support 4 is carriage 40. Extending forwardly (+X) along lateral axis X from carriage 40 are the receiving arms 46. The receiving arms 46 are spaced apart along the lateral axis Y to an extent that the arms 154 are between the receiving arms 46. Installed between receiving arms 46 is the support fixture 48 that spans a space between the receiving arms 46 along the lateral axis Y.

FIGS. 11A, 11B, 12, 12A, 13, 13A, and 14 (FIGS. 11-14) depict a second embodiment of the support fixture 48. In comparing FIGS. 11-14 with FIGS. 5A and 5B, like elements are similar and have similar functions. New element numbers are introduced infra that make the second embodiment different than first embodiment for support fixture 48. The second embodiment of support fixture 48 differs from the first embodiment in being formed from two parts including an interface fixture 180 and a replaceable support 182. Also, previously discussed elements of support fixture 48 may not be discussed infra because they are already described with respect to FIGS. 5A, 5B, and 5C.

Figure 11A:
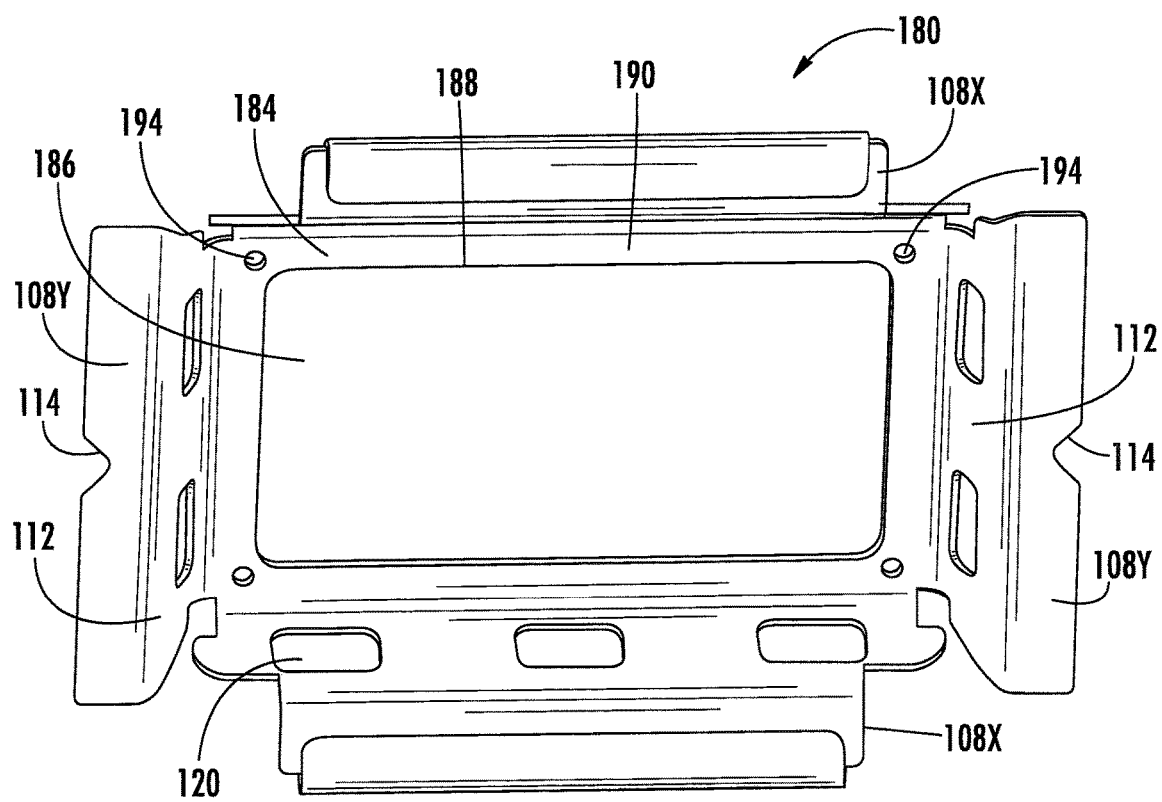
FIG. 11A is a top isometric view of an embodiment of an interface fixture.

FIG. 11A is a top isometric view of an embodiment of the interface fixture 180. The interface fixture includes upper portion 108 (which includes 108X and 108Y), side wall(s) 112, and a lower portion 184. In the illustrated embodiment, the lower portion 184 defines a central opening 186. The lower portion 184 is a lateral rim 184 that extends laterally inwardly to peripheral edges 188 of central opening 186. While lateral rim 184 extends laterally, one or more of the side walls 112 define an oblique angle with respect to the lateral rim 184, the upper portions 108, and the vertical axis Z. Formed into the side walls 112 are large openings 120.

Figure 11B:
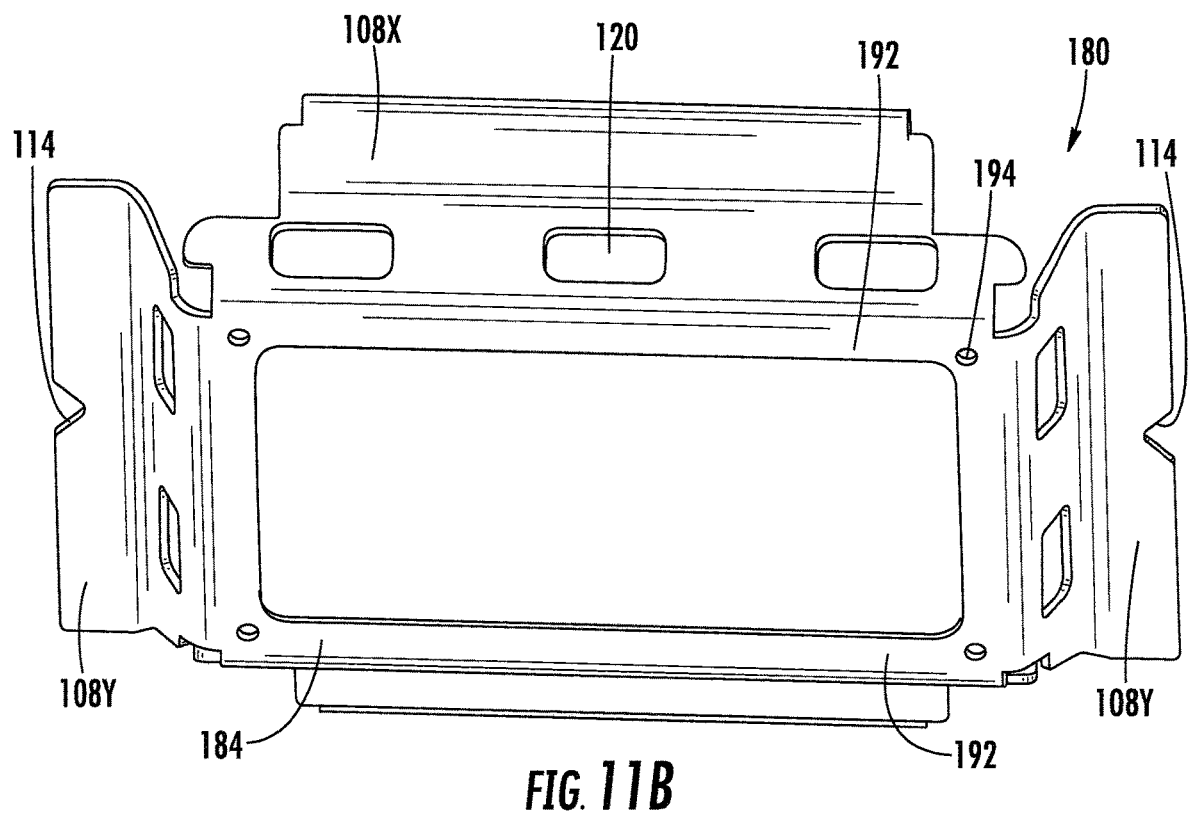
FIG. 11B is a bottom isometric view of an embodiment of an interface fixture.

FIG. 11B is a bottom isometric view of an embodiment of the interface fixture 180. The lateral rim 184 has opposed upper 190 and lower 192 surfaces. Lateral rim 184 includes attachment features 194. In the illustrated embodiment attachment features 194 are four holes 194 that extend vertically through the lateral rim 184 coupling the upper 190 and lower 192 surfaces.

Figure 12:
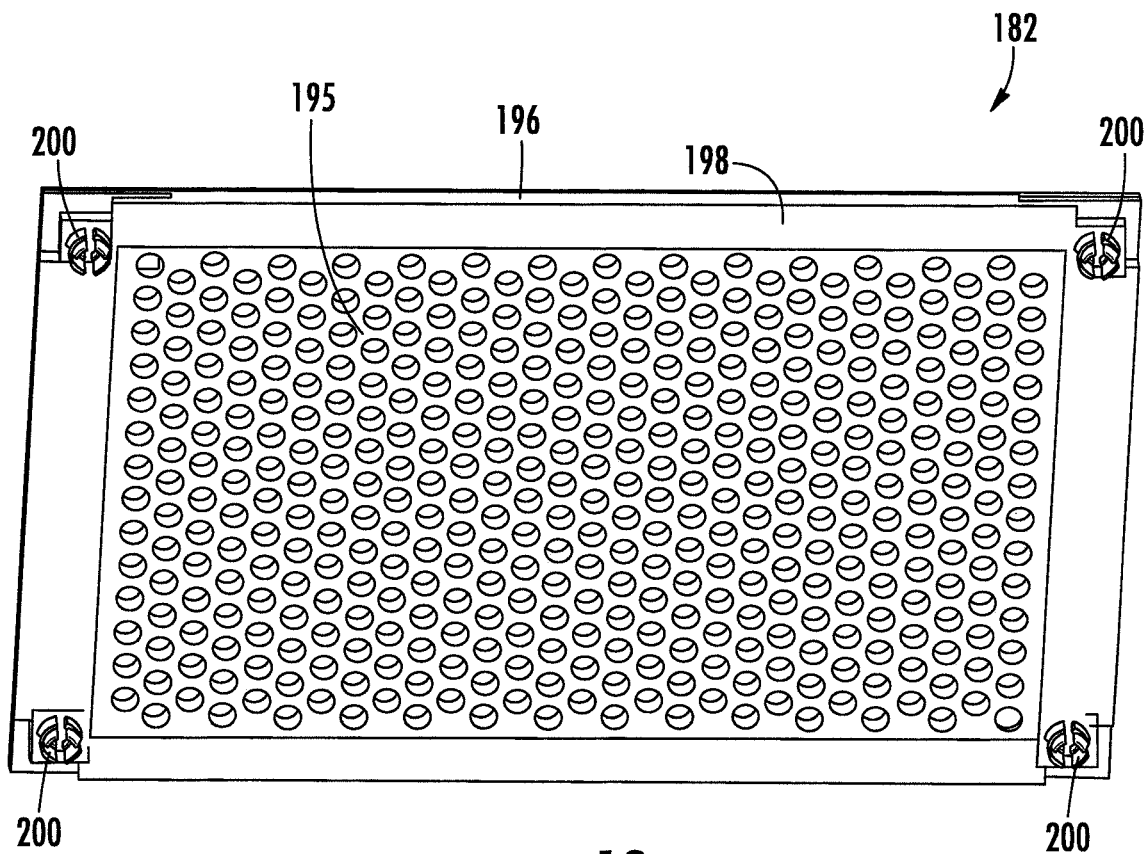
FIG. 12 is a top isometric view of an embodiment of a replaceable support.
Figure 12A:
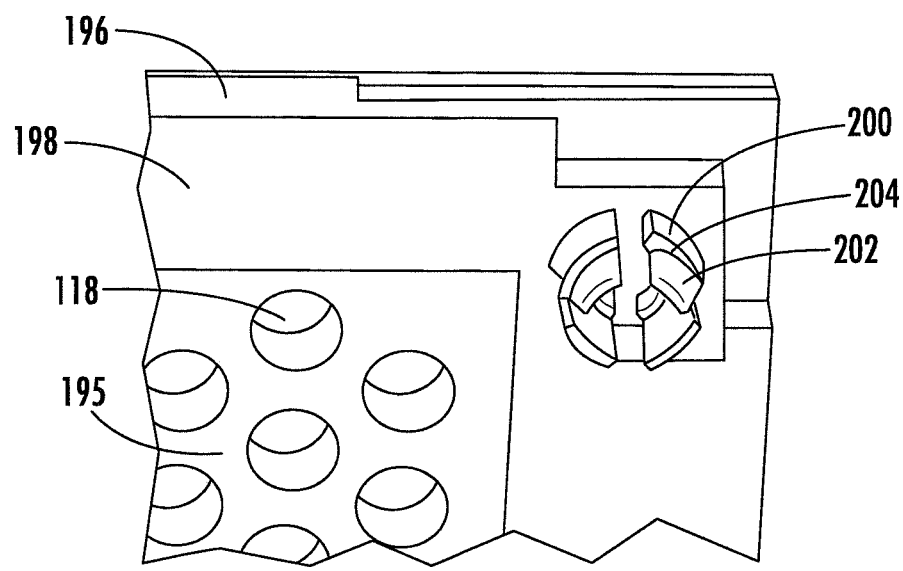
FIG. 12A is a detail view taken from FIG. 12.

FIG. 12 is a top isometric view of an embodiment of a replaceable support 182. The replaceable support includes a planar portion 195 and a peripheral support portion 196. The planar portion 195 defines a dense array of small openings 118 that are similar to those described with respect to FIGS. 5A and 5C.

The peripheral support portion 196 includes an upper peripheral surface 198 and a plurality of complementary attachment features 200. In the illustrated embodiment, the complementary attachment features 200 include four upstanding pins 200 that extend upwardly from the upper peripheral surface 198. A single upstanding pin 200 is illustrated in more detail in FIG. 12A. The pin 200 has a distal (uppermost) end 202 that is laterally or radially deformable. The pin 200 also includes a narrower or slotted portion 204 between the uppermost end 202 and the upper peripheral surface 198. In the illustrated embodiment, the pin 200 is defined by four separate portions.

Figure 13:
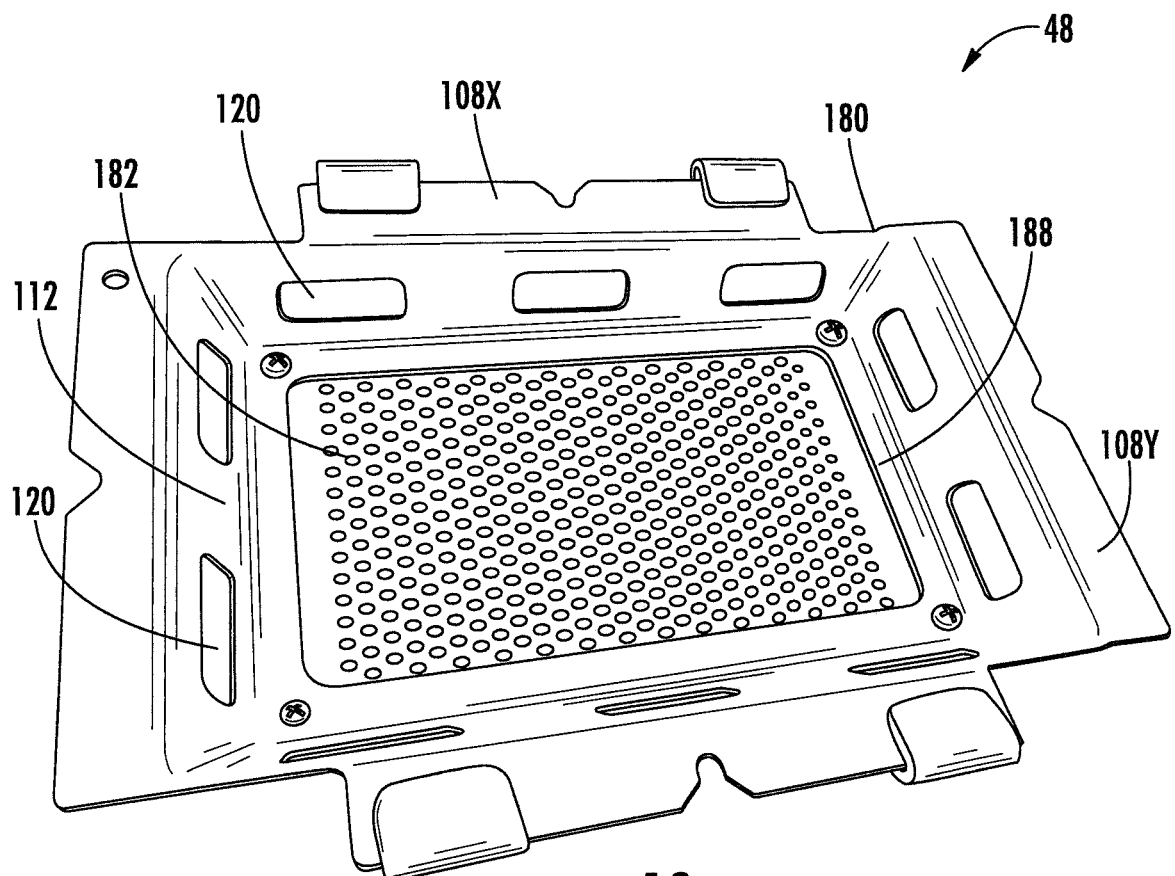
FIG. 13 is a top isometric view of an embodiment of a support fixture which includes a replaceable support attached to an interface fixture.

FIG. 13 is an isometric top view of an embodiment of the support fixture 48 which includes the replaceable support 182 fastened to the interface fixture 180. In this configuration, the upper peripheral surface 198 is in close facing engagement with the lower surface 192 of lateral rim 184. The complementary attachment features 200 are coupled to the attachment features 194. The peripheral edges 188 of central opening 186 laterally surround the planar portion 195 of replaceable support 182. Thus, the central opening 186 overlays the dense array of small openings 118.

Figure 13A:
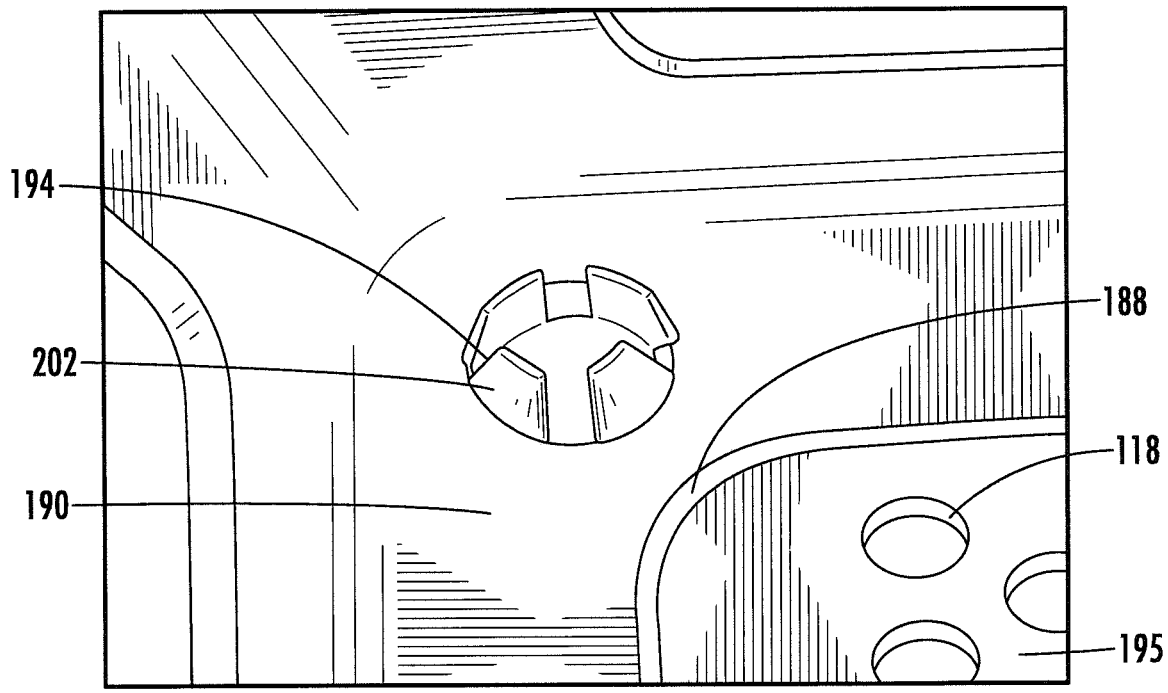
FIG. 13A is a detail view taken from FIG. 13.

FIG. 13A is a more detailed view of FIG. 13 illustrating engagement between an attachment feature 194 and a complementary attachment feature 200. The upstanding pin 200 extends through an opening 194. The narrower portion 204 of pin 200 contains a thickness of a metal sheet that defines the opening 194. The laterally deformable uppermost end 202 of the pin 200 extends above upper surface 190 and has laterally expanded beyond the edge of opening 194 to form an interlocking structure.

Other designs are possible. In a first alternative embodiment, a pin 200 can be a solid pin 200 that forms an interference fit with the opening 194. In a second alternative embodiment, the attachment feature 194 is a pin and the complementary attachment feature 200 is an opening.

Figure 14:
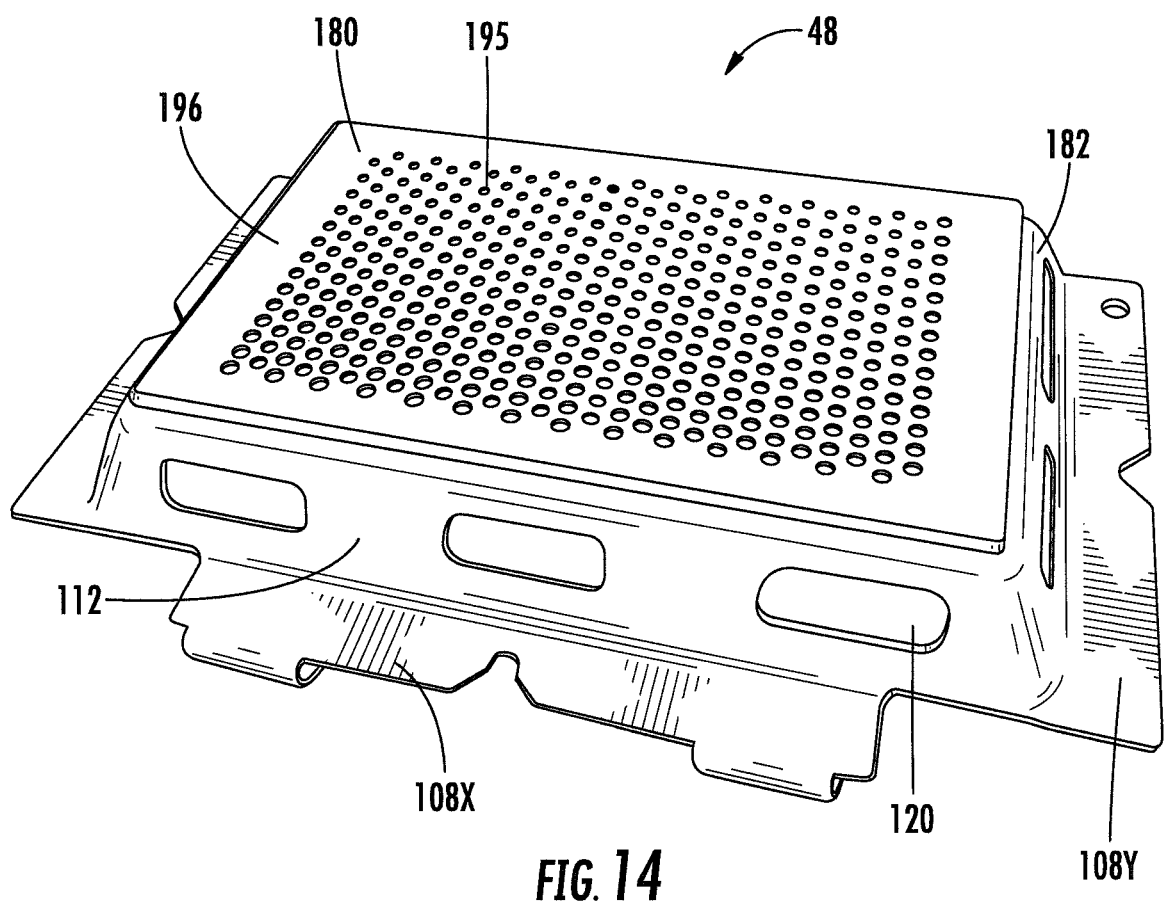
FIG. 14 is a bottom isometric view of an embodiment of a support fixture which includes a replaceable support attached to an interface fixture.

FIG. 14 is an isometric bottom view of the support fixture 48. The illustrated embodiment with the interface fixture 180 and the replaceable support 182 is functionally similar to the support fixture described with respect to FIGS. 5A-C. However, this design has an added advantage that the difficult to clean planar portion 195 is replaceable and can be optimized for a particular resin 54 used for forming a three dimensional article of manufacture 72. The more expensive interface fixture 180 can be reused.

The specific embodiments and applications thereof described above are for illustrative purposes only and do not preclude modifications and variations encompassed by the scope of the following claims.

What is claimed:

1. A support fixture for a three dimensional printing system for forming a three dimensional article of manufacture in a resin vessel containing resin and having a transparent sheet forming a lower bound for the resin comprising:
an interface fixture including:
an upper portion having alignment and gripping features;
a lower portion surrounding a central opening and including a plurality of attachment features; and
a side wall coupling the upper and lower portions; and
a replaceable support including:
a planar portion having a lower surface for attachment of the three dimensional article of manufacture; and
a peripheral support portion including complementary attachment features engaging the attachment features when the peripheral support portion is mounted to the lower portion of the interface fixture.

2. The support fixture of claim 1 wherein the interface fixture is formed from a metallic material and the replaceable support is formed from a polymeric material.

3. The support fixture of claim 1 wherein at least the upper portion of the interface fixture is formed from a magnetic material.

4. The support fixture of claim 1 wherein the upper portion of the interface fixture extends laterally outwardly from the side wall.

5. The support fixture of claim 4 wherein the side wall includes a portion defining an oblique angle with respect to a vertical axis and the lateral extension of the upper portion of the interface fixture.

6. The support fixture of claim 1 wherein the planar portion defines an array of small openings.

7. The support fixture of claim 6 wherein the side wall defines a plurality of larger openings individually having a cross sectional area equal to a plurality of the small openings.

8. The support fixture of claim 6 wherein the array of small openings define an inflow distance of less than two millimeters.

9. The support fixture of claim 6 wherein the array of small openings includes at least 100 small openings.

10. The support fixture of claim 1 wherein the lower portion of the interface fixture includes a rim that extends inwardly to the edges of the central opening, the rim has a lower surface, the peripheral support portion of the replaceable support has an upper surface mounted to the lower surface of the rim.

11. The support fixture of claim 10 wherein the attachment features include openings that pass vertically through the rim, the complementary attachment features extend upwardly from the upper surface of the peripheral support portion and through the openings.

12. The support fixture of claim 11 wherein the complementary attachment features are pins with a laterally deformable upper end that extend through the openings and interlock with the rim.

13. The support fixture of claim 1 wherein the attachment features in the rim include openings, the complementary attachment features including pins that pass into the openings and secure the replaceable support to the interface fixture by one or more of an interference fit and an interlocking engagement.

* * * * *